United States Patent [19]
Yamawaki et al.

[11] Patent Number: 6,091,214
[45] Date of Patent: Jul. 18, 2000

[54] ELECTRIC POWER STEERING APPARATUS

[75] Inventors: Shigeru Yamawaki; Yasuo Shimizu; Shigenori Takimoto, all of Wako, Japan

[73] Assignee: Honda Giken Kogyo Kabushiki Kaisha, Tokyo, Japan

[21] Appl. No.: 09/153,395

[22] Filed: Sep. 15, 1998

[30] Foreign Application Priority Data

Sep. 16, 1997 [JP] Japan ..................................... 9-251199
Sep. 3, 1998 [JP] Japan ................................... 10-249730

[51] Int. Cl.$^7$ .............................. B61C 15/08; B62D 5/04
[52] U.S. Cl. ............................ 318/52; 318/587; 318/433; 180/443
[58] Field of Search ..................................... 318/432–434, 318/52, 85, 585–587; 180/443–446

[56] References Cited

U.S. PATENT DOCUMENTS

| | | | |
|---|---|---|---|
| 3,687,242 | 8/1972 | Green | 188/181 C |
| 3,707,312 | 12/1972 | Drutchas et al. | 303/116.3 |
| 4,751,978 | 6/1988 | Drutchas et al. | 180/446 |
| 4,830,127 | 5/1989 | Ito et al. | 180/446 |
| 5,116,254 | 5/1992 | Sano et al. | 180/412 |
| 5,473,231 | 12/1995 | McLaughlin et al. | 318/433 |
| 5,475,289 | 12/1995 | McLaughlin et al. | 318/432 |
| 5,504,403 | 4/1996 | McLaughlin | 318/432 |
| 5,762,157 | 6/1998 | Uehara | 180/197 |

FOREIGN PATENT DOCUMENTS 5-58318   3/1993   Japan .

*Primary Examiner*—Brian Sircus
*Attorney, Agent, or Firm*—Merchant & Gould P.C.

[57] ABSTRACT

An electric power steering apparatus comprises a control unit for drive-controlling a motor to apply an assist torque to a steering system based on signals from various sensors. The control unit comprises a slip angle difference predicting section for predicting a difference between a slip angle of front wheels and a slip angle of rear wheels, and a correcting section for correcting, based on an angle difference signal outputted from the slip angle difference predicting section, a target torque signal supplied to the motor. Behavior of a vehicle is predicted from the angle difference signal and the target torque signal is corrected by a correction amount corresponding to the angle difference signal so that the motor can be drives controlled with the influence of a change in a road surface reaction force taken into consideration.

10 Claims, 11 Drawing Sheets

ELECTRIC POWER STEERING APPARATUS

BACKGROUND OF THE INVENTION

1. Field of the Invention

This invention relates generally to an electric power steering apparatus for reducing a steering force of a driver by directly applying power of an electric motor to a steering system and, more particularly, to an electric power steering apparatus capable of informing a drive of a change in a road reaction force to thereby make the driver carry out proper steering.

2. Description of the Related Art

There has been known an electric power steering apparatus which comprises a control unit, a motor driver and a motor. In the apparatus, a target torque signal for driving the motor is generated by the control unit in correspondence with a steering torque generated by turning a steering wheel. A motor control signal for drive-controlling the motor based on the target torque signal is supplied to the motor driver composed of a bridge circuit; The motor is then PWM-driven via the motor driver to thereby apply an assist torque produced by the motor to a steering system.

The control unit drive-controls the motor by causing a signal corresponding to a motor current to be fed back (negative feedback) to the target torque signal to quickly equalize the motor current flowing through the motor.

Further, the target torque signal is corrected by a vehicle speed signal detected by a vehicle speed sensor, the target torque signal is reduced with an increase in the vehicle speed, a sufficiently large assist torque is added to the steering system when the vehicle speed is low and when the vehicle speed is high, a small assist torque is added to the steering system, thereby achieving reduction in the steering force of a driver when the vehicle speed is low and behavioral stability of the vehicle when the vehicle speed is high.

Further, there has been disclosed a conventional electric power steering apparatus in Japanese Patent Laid-Open Publication No. HEI-5-58318 in which when skidding of a vehicle is considerable, road information is transmitted to a driver via a steering wheel by magnifying a road reaction force from a road surface by reducing an assist torque relative to a steering torque.

In the electric power steering apparatus disclosed in Japanese Patent Laid-Open Publication No. HEI-5-58318, there are provided a vehicle speed sensor, a steering angle sensor and a lateral acceleration sensor. In the apparatus, a reference lateral acceleration G0 which is assumed to arise in a vehicle when the latter undergoes no disturbance is determined from a vehicle speed V detected by the vehicle speed sensor and a steering angle θ detected by the steering angle sensor. Determination is then made as to whether an absolute value |Gact−G0| which is a difference between an actual lateral acceleration Gact detected, as actually applied to the vehicle, by the lateral acceleration sensor and a reference lateral acceleration G0, is larger than a predetermined value "g". When it is larger (|Gact−G0|>g), skidding (lateral slipping) of the vehicle is regarded to be large and an assist characteristic map for low road surface friction coefficient $\mu$ road which is previously set is selected. When it is small (|Gact−G0|<g), skidding of the vehicle is regarded to be small, an assist characteristic map for high $\mu$ road set in advance is selected, and an assist amount is controlled in accordance with a steering force.

In the disclosed electric power steering apparatus, there is a tendency that the driver cannot feel accurately the behavior of the vehicle via the steering wheel as information since a subtle change in a road reaction force caused by the behavior of the vehicle is restrained owing to its arrangement in which an assist torque corresponding to the steering force of the driver is added to the steering system.

In recent years, such a tendency has been made significant by a tendency of reduction in a road reaction force resulting from reduction in the steering force and a tendency of making a steering gear ratio as small as possible.

With regard to such a steering feeling in respect of the low road reaction force, it is desired of a driver to carry out accurate steering operation for the behavior of the vehicle by accurately feeling the road reaction force in a critical region of the behavior of the vehicle or in operation at emergency.

For example, when a vehicle is likely to spin in a critical region of the behavior of the vehicle, a driver needs to swiftly carry out optimum steering operation by grasping the behavior of the vehicle.

It is the most readily available and effective method to become conscious of a change in a road reaction force associated with the behavior of the vehicle for a driver to grasp the vehicle behavior.

In the electric power steering apparatus disclosed in Japanese Patent Laid-Open Publication No. HEI-5-58318, the assist characteristic map for high $\mu$ road or low $\mu$ road is selected based on a difference between the actual, lateral acceleration Gact actually applied on the vehicle and the reference lateral acceleration G0 where the vehicle undergoes no disturbance. However, the reference lateral acceleration G0 is difficult to set since it varies with a road surface friction coefficient $\mu$.

Although a friction coefficient ($\mu$) sensor may be mounted on a vehicle to set the reference lateral acceleration G0 in correspondence with the road friction coefficient $\mu$, the friction coefficient ($\mu$) is difficult to detect accurately even when the friction coefficient ($\mu$) sensor is used.

For example, the lateral acceleration G with a parameter of the friction coefficient ($\mu$) in respect of a steering θ is provided with a linear characteristic when the steering angle θ falls in a predetermined range. However, when the steering angle θ exceeds the predetermined range, the characteristic becomes a nonlinear and the reference lateral acceleration G0 cannot be set.

Further, in the conventional electric power steering apparatus disclosed in JP Pat. Laid-Open Publication No. JP-HEI-58318, skidding of a vehicle is determined based on the absolute value |Gact−G0| of the difference between the actual lateral acceleration Gact and the reference lateral acceleration G0 and accordingly, although whether skidding of the vehicle is large or small can be determined, whether skidding, of the vehicle is caused by oversteering or understeering cannot be determined and the behavior of the vehicle cannot be accurately informed to a driver as the reaction force via a steering wheel.

SUMMARY OF THE INVENTION

It is therefore an object of the present invention to provide an electric power steering apparatus capable of detecting an oversteering state or an understeering state of behavior of a vehicle in correspondence with a road state, transmitting road information (reaction force) to a driver by applying a auxiliary steering force corresponding to the oversteering state or the understeering state to a steering system, and having the driver carry out an optimum steering operation in accordance with an intention of the driver.

In order to resolve the above-described problems, according to an aspect of the present invention, there is provided an electric power steering apparatus having a control unit which comprises a slip angle difference predicting section for predicting a difference between a front wheel slip angle and a rear wheel slip angle, and a correcting section for correcting a target torque signal based on an angle difference signal from the slip angle difference predicting section.

As explained above, the control unit is provided with the slip angle difference predicting section for predicting the difference between the front wheel slip angle and the rear wheel slip angle, and the correcting section for correcting the target torque signal based on the angle difference signal from the slip angle difference predicting section. As a result, the behavior of the vehicle can be predicted from the angle difference signal while the target torque signal can be corrected by a correction amount corresponding to the angle difference signal. Accordingly, the motor for applying the assist torque to the steering system can be controlled in consideration of influence of a change in the road reaction.

The slip angle difference predicting section calculates the angle difference based on a turn angle signal detected by a turn angle sensor for detecting a turn angle of the front wheel, a vehicle speed signal detected by a vehicle speed sensor, a yaw rate signal detected by a yaw rate sensor, and dimensional parameters of a vehicle.

In the slip angle difference predicting section, the angle difference is calculated based on the turn angle signal detected by the turn angle sensor for detecting the turn angle of the front wheel, the vehicular speed signal detected by the vehicular speed sensor, the yaw rate signal detected by the yaw rate sensor and dimensional parameters of the vehicle. Consequently, the angle difference can be calculated by using the existing sensors mounted on the vehicle without using an additional sensor for actually detecting the angle difference.

In a desired form, the correcting section comprises an understeering correction amount outputting section for outputting an understeering correction amount, an oversteering correction amount outputting section for outputting an oversteering correction amount, a first direction determining section for determining coincidence or noncoincidence between a direction of the angle difference signal detected by the slip angle difference predicting section and a direction of the yaw rate signal, and a selecting section for selecting the oversteering correction amount outputting section when a determining signal from the first direction determining section indicates coincidence of the directions and selecting the understeering correction amount outputting section when the determining signal indicates noncoincidence of the directions.

As set forth above, the correcting section comprises the understeering correction amount outputting section for outputting the understeering correction amount, the oversteering correction amount outputting section for outputting the oversteering correction amount, the first direction determining section for determining coincidence or noncoincidence between the direction of the angle difference signal detected by the slip angle difference predicting section and the direction of the yaw rate signal, and the selecting section for selecting the oversteering correction amount outputting section when the determining signal from the first direction determining section indicates coincidence of the directions and selecting the understeering correction amount outputting section when the determining signal indicates noncoincidence of the directions. As a result, whether the behavior of the vehicle is in the oversteering region or the understeering region can be determined by the direction detected by the determining signal, whether the behavior of the vehicle is in the oversteering region or the understeering region is transmitted to the driver as the reaction force via the steering wheel and the assist torque applied to the steering system can be corrected in correspondence with the behavior of the vehicle.

Desirably, the correction section also comprise a subtracting correction section for subtraction-correcting the target torque signal with a subtracting correction signal corresponding to an understeering correction amount from the understeering correction amount outputting section, and a subtracting correction section for subtraction-correcting the target torque signal with a subtracting correction signal corresponding to an oversteering correction amount from the oversteering correction amount outputting section.

As mentioned above, the correction section comprises the subtracting correction section for subtraction-correcting the target torque signal with the subtracting correction signal in correspondence with the understeering correction amount from the understeering correction amount outputting section, and the subtracting correction section for subtraction-correcting the target torque signal with the subtracting correction signal in correspondence with the oversteering correction amount from the oversteering correction amount outputting section. As a result, in the understeering region, a large reaction force can be transmitted to the driver via the steering wheel by reducing the assist torque through correction to subtract the understeering correction amount from the target torque signal while in the oversteering region, a large reaction force can be transmitted to the driver via the steering wheel by correction to subtract the oversteering correction amount from the target torque signal. Further, optimum correction in correspondence with the oversteering state and under-steering state can be carried out by setting the oversteering correction amount and the understeering correction amount independently from each other.

Preferably, the correcting section also comprises an angle difference change amount calculating section for calculating a change amount of the angle difference signal, and an angle difference change coefficient generating section for outputting an angle difference change coefficient in correspondence with the angle difference change signal from the angle difference change amount calculating section so that the understeering correction amount and the oversteering correction amount can be corrected by the angle difference change coefficient.

An explained above, the correcting section comprises the angle difference change amount calculating section for calculating the change amount of the angle difference signal, and the angle difference change coefficient generating section for outputting the angle difference change coefficient in correspondence with the angle difference change signal from the angle difference change amount calculating section so that the understeering correction amount and the oversteering correction amount can be corrected by the angle difference change coefficient. As a result, when the behavior of the vehicle under the understeering state or the oversteering state is changed rapidly, the behavior of the vehicle, that is, a change in the reaction force, can be transmitted to the driver via the steering wheel.

In a further specific form of the invention, the correcting section comprises an understeering correction amount outputting section for outputting an understeering correction amount, an oversteering correction amount outputting section for outputting an oversteering correction amount, a countersteering correction amount outputting section for outputting a countersteering correction amount, a first direction determining section for determining coincidence or noncoincidence between a direction of the angle difference signal detected by the slip angle difference predicting section and a direction of the yaw rate signal detected by the yaw rate sensor, a second direction determining section for determining coincidence or noncoincidence between the direction of the angle difference signal detected by the slip angle difference predicting section and a direction of the steering toque signal detected by the steering torque sensor, and a selecting section for selecting said oversteering correction amount outputting section when results of determination by said first direction determining section indicate coincidence of the directions, selecting the understeering correction amount outputting section when both determination results by the first direction determining section and the second direction determining section indicate noncoincidence of the directions and selecting the countersteering correction amount outputting section when a determination result by the first direction determining section indicates noncoincidence of the directions and a determination result of the second direction determining section indicates coincidence of the directions.

As discussed above, the correcting section comprises the understeering correction amount outputting section for outputting the understeering correction amount, the oversteering correction amount outputting section for outputting the oversteering correction amount, the countersteering correction amount outputting section for outputting the countersteering correction amount, the first direction determining section for determining coincidence or noncoincidence between the direction of the angle difference signal detected by the slip angle difference predicting section and the direction of the yaw rate signal detected by the yaw rate sensor, the second direction determining section for determining coincidence or noncoincidence between the direction of the angle difference signal detected by the slip angle difference predicting section and the direction of the steering torque signal detected by the steering torque sensor, and the selecting section for selecting siad oversteering correction amount outputting section when results of determination by said first direction determining section indicate coincidence of the directions selecting the understeering correction amount outputting section when both results of determination by the first direction determining section and the second direction determining section indicate noncoincidence of the directions and selecting the counter-steering correction amount outputting section when a result of determination by the first direction determining section indicates noncoincidence of the directions and a result of determination of the second direction determining section indicates coincidence of the directions. As a result, whether the behavior of the vehicle is in the understeering state or the excessive countersteering state is determined by determining the directions of the angle difference signal, the yaw rate signal and the steering torque signal and a correction amount in correspondence with the understeering state or the excessive countersteering state can be outputted.

In a still further specific form of the invention, the correcting section comprises a subtracting correction section for subtraction-correcting the target torque signal with the subtracting correction signal corresponding to the understeering correction amount from the understeering correction amount outputting section, a third direction determining section for determining coincidence or noncoincidence between a direction of a differentiated value of the angle difference signal and a direction of the steering torque signal, and an adding-subtracting correction section for addition-correcting the target torque signal with an adding correction signal in correspondence with the oversteering correction amount or the countersteering correction amount from the oversteering correction amount outputting section or the countersteering correction amount outputting section when a determination result of the third direction determining section indicates noncoincidence of the directions and subtraction-correcting the target torque signal with a subtracting correction signal in correspondence with the oversteering correction amount or the countersteering correction amount from the oversteering correction amount outputting section or the countersteering correction amount outputting section when the determination result from the third direction determining section indicates coincidence of the directions.

As stated above, the correcting section comprises the subtracting correction section for subtraction-correcting the target torque signal with the subtracting correction signal in correspondence with the understeering correction amount from the understeering correction amount outputting section, the third direction determining section for determining coincidence or noncoincidence between the direction of the differentiated value of the angle difference signal and the direction of the steering torque signal, and the adding-subtracting correction section for addition-correcting the target torque signal with the adding correction signal in correspondence with the oversteering correction amount or the countersteering correction amount from the oversteering correction amount outputting section or the countersteering correction amount outputting section when the determination result of the third direction determining section indicates noncoincidence of the directions and for subtraction-correcting the target torque signal with the subtracting correction signal in correspondence with the oversteering correction amount or the countersteering correction amount from the oversteering correction amount outputting section or the countersteering correction amount outputting section when the determination result from the third direction determining section indicates coincidence of the directions. As a result, by determining the direction of the differentiated value of the angle difference signal and the direction of the steering torque signal, whether the countersteering correction amount is excessively large or excessively small can be transmitted to the driver through the reaction force by adding the oversteering correction or the countersteering correction amount to the target torque signal or subtracting the oversteering correction amount or the countersteering correction amount from the target torque signal.

In a still further specific form, the correcting section comprises an angle difference change amount calculating section for calculating a change amount of the angle difference signal, and an angle difference change coefficient generating section for outputting an angle difference change coefficient in correspondence with an angle difference change signal from the angle difference change amount calculating section so that the understeering correction amount, the oversteering correction amount and the countersteering correction amount can be corrected by the angle difference change coefficient.

As mentioned above, the correcting section comprises the angle difference change amount calculating section for calculating the change amount of the angle difference signal, and the angle difference change coefficient generating section for outputting the angle difference change coefficient in correspondence with the angle difference change signal from the angle difference change amount calculating section so that the understeering correction amount, the oversteering correction amount and the countersteering correction amount can be corrected by the angle difference change coefficient. As a result, even when the behavior of the vehicle in the understeering state, the oversteering state or the countersteering state is rapidly changed, the change in the behavior of the vehicle can be quickly transmitted to the driver as a change in the reaction force via the steering wheel.

BRIEF DESCRIPTION OF THE DRAWINGS

Preferred embodiments of the present invention will be described hereinbelow, by way of example only, with reference to the accompanying drawings, in which.

DETAILED DESCRIPTION OF THE PREFERRED EMBODIMENTS

The following description is merely exemplary in nature and in no way intended to limit the invention or its application or uses.

Generally, the present invention is directed to an arrangement wherein a reaction force corresponding to the behavior of a vehicle in an understeering state, an oversteering state and an excessive countersteering state is accurately transmitted to a driver through a steering wheel to thereby assist in steering operation desired by the driver in accordance with the respective behavior of the vehicle.

Figure 1:
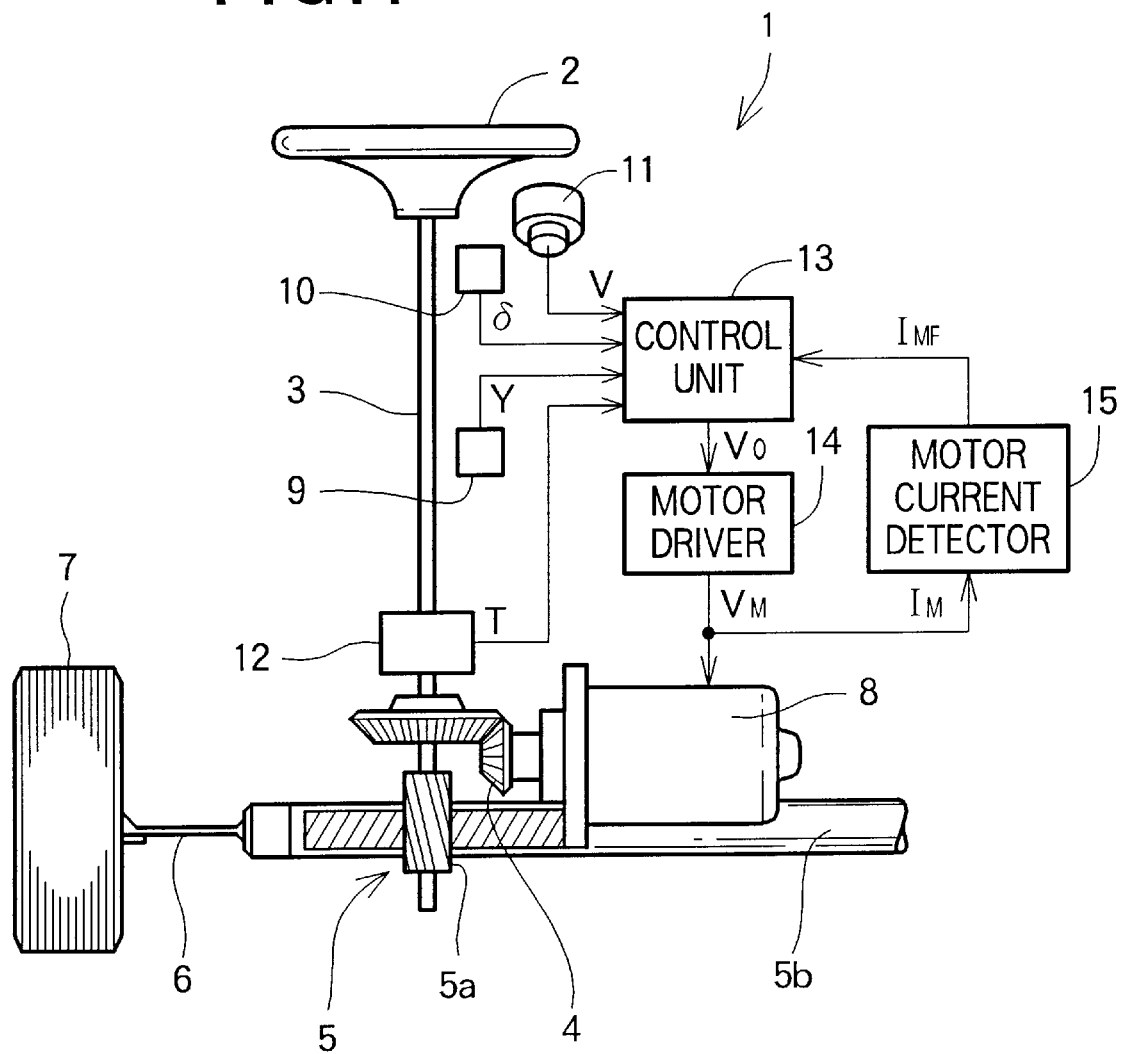
FIG. 1 is a schematic view illustrating the overall arrangement of an electric power steering apparatus according to the present invention.

Referring to FIG. 1, an electric power steering apparatus 1 comprises a steering wheel 2, a steering shaft 3, a hypoid gear 4, a rack-and-pinion mechanism 5 having a pinion 5a and a rack shaft 5b. It also comprises a tie rod 6, front steered wheels 7 (only one shown), a motor 8 for providing an assist torque to a steering system, a control unit 13, a motor driver 14 and a motor current detector 15.

Further, the electric power steering apparatus 1 is provided with a yaw rate sensor 9 for detecting a yaw rate produced in a vehicle and outputting a yaw rate signal Y converted into an electric signal corresponding to the yaw rate, a turn angle sensor 10 for detecting a turn angle of the front wheel and outputting a turn angle signal δ converted into an electric signal corresponding to the turn angle of the front wheel, a vehicle speed sensor 11 for detecting a vehicle speed and outputting a vehicle speed signal V converted into an electric signal corresponding to the vehicle speed, and a steering torque sensor 12 for detecting a steering torque produced by the steering wheel 2 and outputting a steering torque signal T converted into an electric signal corresponding to the steering torque.

The turn angle signal δ may be calculated from a steering angle of the steering shaft.

Each of the yaw rate signal Y, the turn angle signal δ and the steering torque signal T has a magnitude and a direction and is supplied to the control unit 13.

In respect of the directions of the yaw rate signal Y, the turn angle signal δ, the vehicle speed V and the steering torque signal T, the clockwise direction is determined to be positive (plus) while the counterclockwise direction is determined to be negative (minus).

When the steering wheel 2 is operated, a manual steering torque produced in the steering shaft 3 changes an operational direction of the front wheels 7 via the tie rod 6 by converting a rotational force of the pinion 5a into a linear movement of the rack shaft 5b in the axial direction via the rack-and-pinion mechanism 5.

As the motor 8 is driven in accordance with the steering torque signal T for assisting in the manual steering torque, the torque of the motor is converted into an assist torque magnified via the hypoid gear 4 and is applied to the steering shaft 3, whereby the steering force of a driver is reduced.

The control unit 13 is comprised basically of a microprocessor and includes various operating units, processing units, determining sections, switching sections, signal generating section, memories and so forth. The control unit 13 generates a target torque signal (IMS) corresponding to the steering torque signal T, a motor control signal V0 (e.g., mixed signal of an ON signal, an OFF signal and a PWM signal) corresponding to a difference between the target torque signal (IMS) and a motor torque signal IMF corresponding to a motor current IM detected by the motor current detector 15 (negative feedback) and controls the drive of the motor driver 14 such that the difference is swiftly nullified (to become 0).

Also, the control unit 13 has a front and rear wheel slip angle difference predicting section and a correcting section, predicts by calculation a difference between a slip angle of front wheels and a slip angle of rear wheels (angle difference signal) based on the yaw rate signal Y, the turn angle signal δ, the vehicle speed signal V and vehicle dimensional parameters (wheel base), determines a correction amount in an understeering region, an oversteering region or an excessive countersteering region based on the magnitude of the difference (angle difference signal), and corrects the target torque signal (IMS) by the correction amount.

Further, the control unit 13 determines that a vehicle state (vehicle behavior) is in any of the understeering region, the oversteering region and the excessive countersteering region by comparing a direction (P) of the difference between the slip angle of the front wheels and the slip of the rear wheels (angle difference signal), a direction (N) of the yaw rats signal Y and a direction (S) of the steering torque signal T.

The motor driver 14 comprises a bridge circuit comprising switching elements of, for example, four power FETs (field effect transistors), insulated gate bipolar transistors (IGBT) and so on, outputs a PWM (pulse-width-modulated) motor voltage VM based on the motor control signal V0, and PWM-drives the motor 8 so that it rotates regularly or reversely.

The motor current detector 15 detects the motor current IM by converting it into a voltage by a resistor, a hole element or the like connected in series with the motor 8 and feeds a motor torque signal IMF corresponding to the motor current IM back to the control unit 13 (negative feedback).

Figure 2:
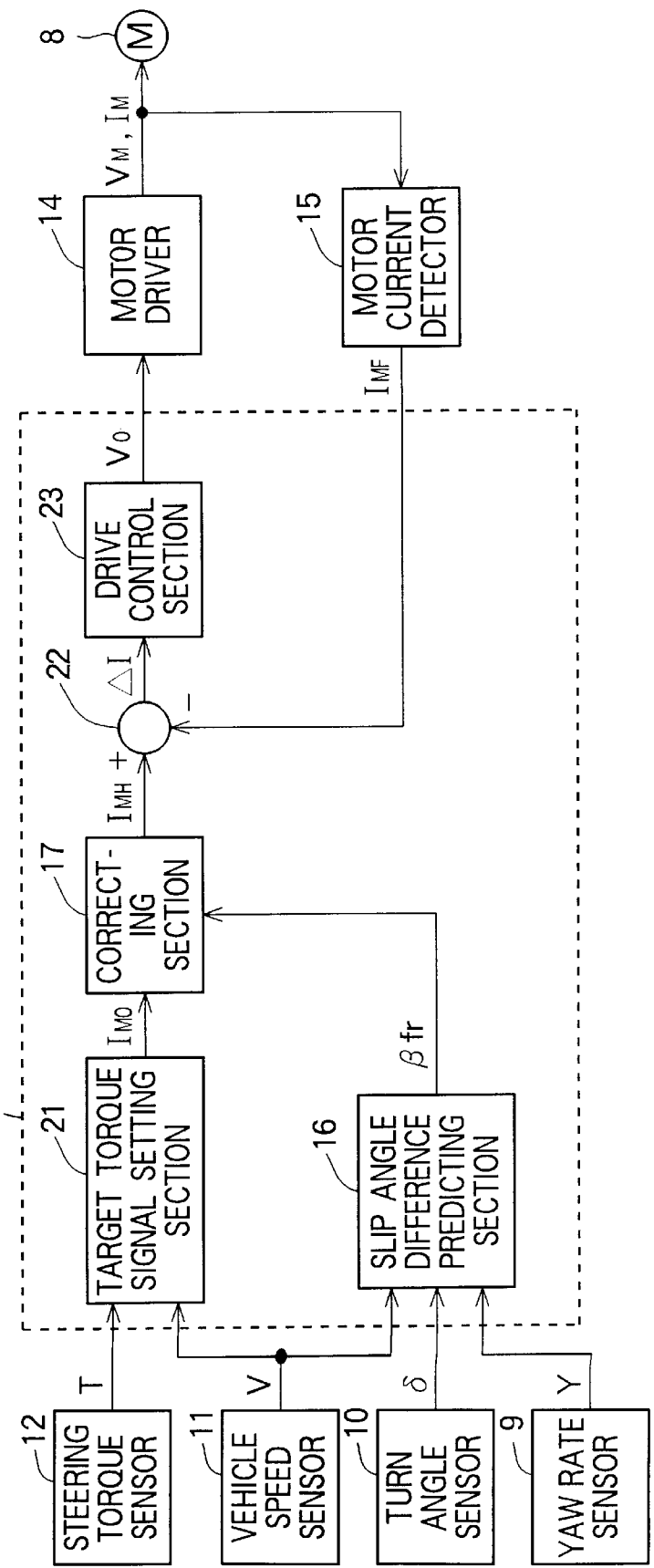
FIG. 2 is a block diagram showing a part of the electric power steering apparatus according to the present invention.

Reference is now made to FIG. 2 showing, in block diagram, part of the electric power steering apparatus according to the present invention.

As shown in FIG. 2, the control unit 13 comprises a target torque signal setting section 21, a correcting section 17, a difference calculating section 22, a drive control section 23 and a slip angle difference predicting section 16.

The target torque signal setting section 21 has a memory such as a ROM (Read Only Memory), stores date in correspondence with the torque signal data T and target torque signal data IMO which have been set in advance based on experimental values or design values with the vehicle speed V as a parameter, reads the corresponding target torque signal data IMO based on the steering torque signal T detected by the steering torque sensor 12 and the vehicle speed signal V detected by the vehicle speed sensor 11, and supplies the target torque signal IMO to the correcting section 17.

The correcting section 17 has a memory such as a ROM, software-controlled comparison, switching and calculation functions, stores correction amounts (understeering correction amount, oversteering correction amount and countersteering correction amount) in accordance with a slip angle difference, generates a corresponding correction amount based on an angle difference signal βfr predicting a difference (βf−βr) between a front wheel slip angle (βf) and a rear wheel slip angle (βr) calculated by the slip angle difference predicting section 16, and supplies a target torque signal IMH produced by correcting the target torque signal IMO by the correction amount to the difference calculating section 22.

When the difference between the front wheel slip angle (βf) and the rear wheel slip angle (βr) is equal to or smaller than a predetermined value, the vehicle is running normally where the behavior of the vehicle is stabilized and accordingly, the correction amount from the correcting section 17 is nullified and the target torque signal IMH outputted from the correcting section 17 is equal to the target torque signal IMO (IMH=IMO).

Meanwhile, when the difference between the front wheel slip angle (βf) and the rear wheel slip angle (βr) exceeds the predetermined value, the behavior of the vehicle is unstable and therefore, the target torque signal IMO is corrected by the correction amount from the correcting section 17 and the target torque signal IMH outputted from the correcting section 17 is produced by subtracting the correction amount from the target torque signal IMO (IMH<IMO) or adding the correction amount thereto (IMH>IMO) in accordance with the behavior of the vehicle.

The difference calculating section 22 is provided with a subtractor or a subtracting function, calculates a difference ΔI (=IMH−IFM) between the target torque signal IMH supplied from the correcting section 17 and the motor torque signal IMF supplied from the motor current detector 15, and supplies the difference signal ΔI (=IMH−IFM) to the drive control section 23.

The drive control section 23 has a PID (Proportional plus Integral plus Derivative) controller and a motor control signal generating section, subjects the difference signal ΔI supplied from the difference calculating section 22 to a proportional (P), integral (I) and derivative (D) control, thereafter generates the PWM motor control signal V0 corresponding to rightward or leftward turning of the steering wheel based on a mixture signal mixed with signals subjected to the proportional, integral and derivative (PID) control, and supplies the motor control signal V0 to the motor driver 14.

The slip angle difference predicting section 16 comprises a memory and a calculating section, predicts the behavior of the vehicle by calculating the difference βfr (=βf−βr) between the front wheel slip angle (βf) and the rear wheel slip angle (βr) based on the vehicle speed V, the yaw rate signal Y, the turn angle signal δ in correspondence with the turn angle of the front wheels and dimensional parameters of the vehicle (e.g., wheel base L) previously set in the memory, and provides the difference βfr to the correcting section 17 as the angle difference signal βfr.

In this way, the control unit 13 can predict the behavior of the vehicle from the angle difference signal βfr, correct the target torque signal IMO by the correction amount in correspondence with the angle difference signal βfr, and drive-control the motor for adding an assist torque to the steering system with an influence of a change in a reaction force taken into consideration, since the control unit 13 is provided with the slip angle difference predicting section 16 for predicting the difference βfr (=βf−βr) between the front wheel slip angle (βf) and the rear wheel slip angle (βr), and the correcting section 17 for correcting the target torque signal IMO based on the angle difference signal βfr from the slip angle difference predicting section 16.

Figure 3:
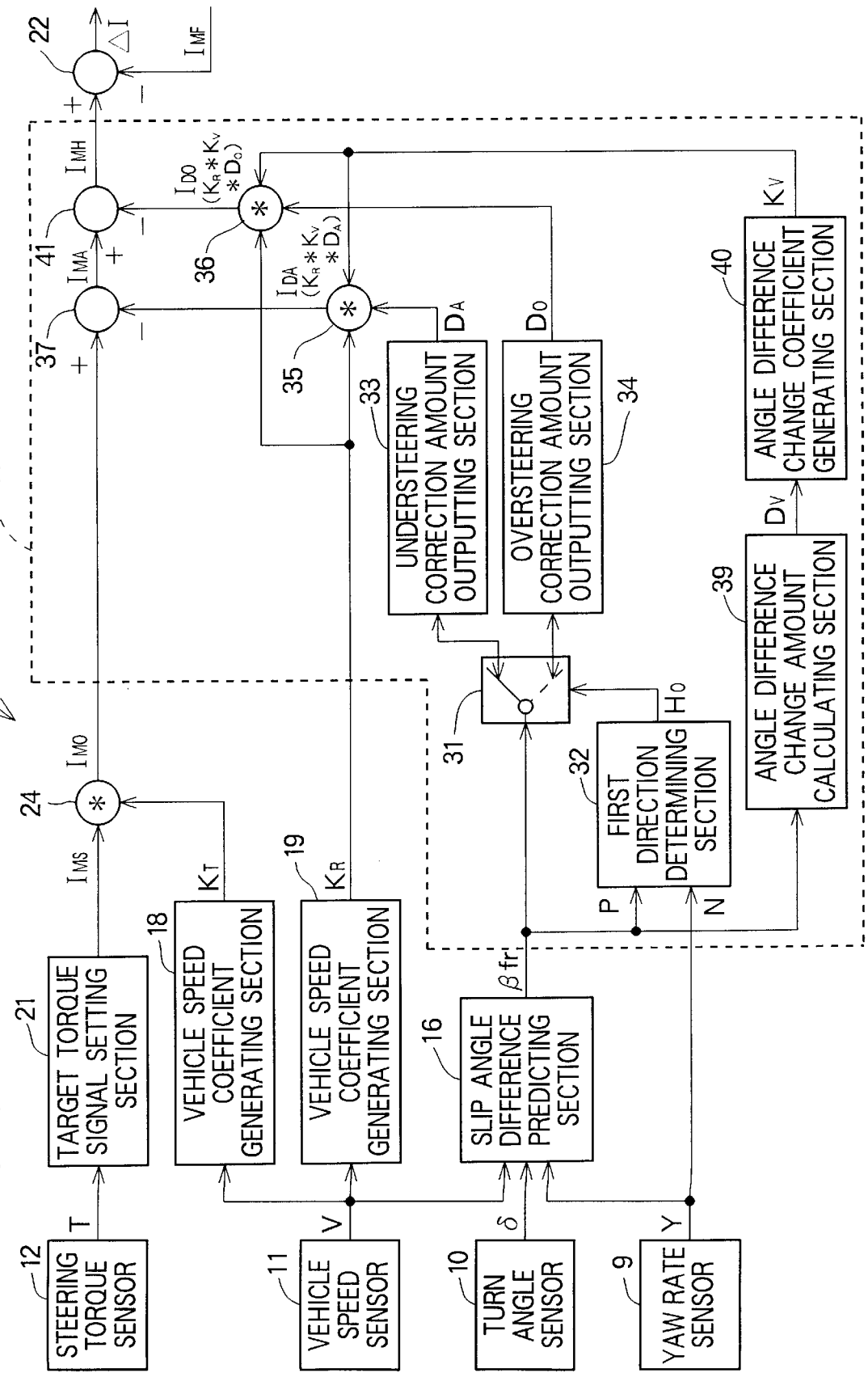
FIG. 3 is a block diagram showing a part of a control unit and a correcting section according to one embodiment of the present invention.

Next, reference is made to FIG. 3 which shows, in block diagram, part of one embodiment of the control unit according to the present invention.

As shown in FIG. 3, the control unit 13 has the target torque signal setting section 21, a vehicle speed coefficient generating section 18, a vehicle speed coefficient generating section 19, a multiplying section 24, the slip angle difference predicting section 16, the correction section 17 and the difference calculating section 22.

Figure 8:
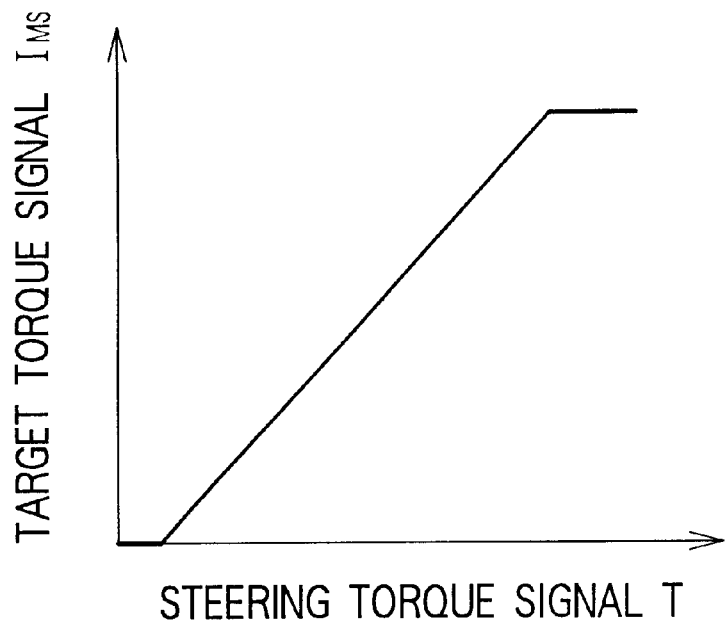
FIG. 8 is a graph illustrating characteristics of a steering torque signal T versus a target torque signal IMS.

The target torque signal setting section 21 pre-stores characteristic data of the steering torque signal T versus a target torque signal IMS, as shown in FIG. 8, in its memory such as a ROM. When the steering torque signal T is supplied from the steering torque sensor 12, the target torque signal setting section 21 reads a corresponding target torque signals IMS and provides it to the multiplying section 24.

Figure 9:
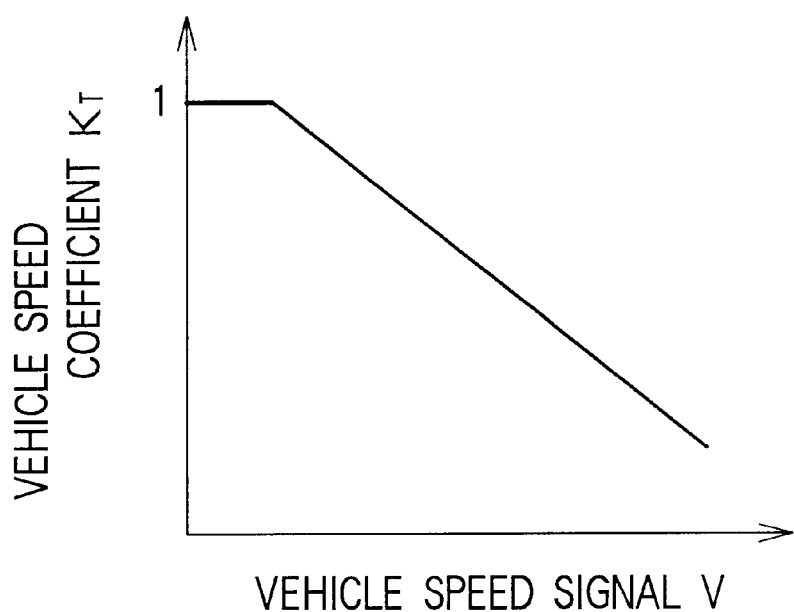
FIG. 9 is a graph illustrating characteristics of a vehicle speed signal V versus a vehicle speed coefficient KT.

The vehicle speed coefficient generating section 18 comprises a memory such as a ROM and pre-stores characteristic data of the vehicle speed V versus a vehicle speed coefficient KT as shown in FIG. 9. When the vehicle speed signal V is supplied from the vehicle speed sensor 11, the vehicle speed coefficient generating section 18 reads a corresponding vehicle speed coefficient KT and provides it to the multiplying section 24.

With a software-controlled multiplying function, the multiplying section 24 multiplies a target torque signal IMS supplied from the target torque signal setting section 21 by the vehicle speed coefficient KT supplied from the vehicle speed coefficient generating section 18 and supplies the target torque signal IMO in correspondence with the vehicle speed V to a subtracting section 37 of the correcting section 17.

Since the vehicle speed coefficient KT has a characteristic such that it decreases with an increase in the vehicle speed signal V, as shown in FIG. 9, the target torque signal IMO shown in FIG. 8 is formed as the target torque signal IMO which is corrected to decrease with the increase in the vehicle speed signal V.

Figure 10:
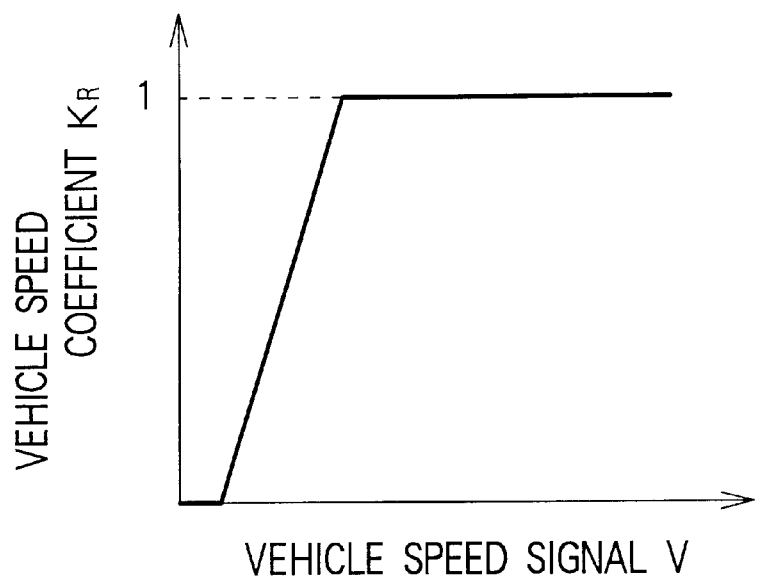
FIG. 10 is a graph illustrating characteristics of the vehicle speed signal V versus a vehicle speed coefficient KR.

The vehicle speed coefficient generating section 19 comprises a memory such as a ROM and pre-stores characteristic data of the vehicle speed V versus a vehicle speed coefficient KR, as shown in FIG. 10. When the vehicle speed signal V is supplied from the vehicle speed sensor 11, the vehicle speed coefficient generating section 19 reads a corresponding vehicle speed coefficient KR and provides it to a multiplying section 35 and a multiplying section 36 of the correcting section 17.

The slip angle difference predicting section 16 has a memory and a calculating function, calculates the difference $\beta fr$ ($=\beta f-\beta r$) between the font wheal slip angle ($\beta f$) and the rear wheel slip angle ($\beta r$) from Equation (1) based on the vehicle speed V, the yaw rate signal Y, the turn angle signal $\delta$ and the dimensional parameter L (e.g., wheel base) of the vehicle preset in the memory and supplies the angle difference signal $\beta fr$ to a selecting section 31, a first direction determining section 32 and an angle difference change amount calculating section 39 of the correcting section 17.

$$\beta fr = Y*L/V - \delta \tag{1}$$

Each of the front wheal slip angle ($\beta f$) and the rear wheel slip angle ($\beta r$) represents an angle in a progressing direction of tires with an orientation of the tires as a reference and accordingly, when the steering wheel is turned in a clockwise direction, the progressing direction of the tires is in a counterclockwise direction relative to the direction of the front wheel tires and when the clockwise direction is determined to be positive (plus), the direction of the front wheel slip angle ($\beta f$) becomes negative (minus).

Similarly, the rear wheel slip angle ($\beta r$) also becomes negative (minus) and a direction (sign) of the angle difference signal $\beta fr$ is designated as negative (minus) until an absolute value $|\beta r|$ of the rear wheel slip angle ($\beta r$) becomes equal to or larger than an absolute value $|\beta f|$ of the front wheel slip angle ($\beta f$) ($|\beta f| \geq |\beta f|$).

Further, lateral acceleration G can be substituted for the yaw rate signal Y supplied to the first direction determining section 32.

In this way, the slip angle difference predicting section 16 calculates the angle difference $\beta fr$ based on the turn angle signal $\delta$ detected by the turn angle sensor 10 for detecting the turn angle of the front wheel, the vehicle speed V detected by the vehicle speed sensor 11, the yaw rate signal Y detected by the yaw rate sensor 9 and the dimensional parameter L of the vehicle. Accordingly, the angle difference $\beta fr$ can be calculated by using the existing sensors mounted on the vehicle without actually detecting the angle difference.

The correcting section 17 comprises the selecting section 31, the first direction determining section 32, an understeering correction amount outputting section 33, an oversteering correction amount outputting section 34, the multiplying section 35, the multiplying section 36, the subtracting section 37 as a subtracting correction section, a subtracting section 41, the angle difference change amount calculating section 39 and an angle difference change coefficient generating section 40.

The selecting section 31 has a software-controlled switching function, switches a changeover switch based on a determining signal H0 supplied from the first direction determining section 32, and supplies the angle difference signal $\beta fr$ fed from the slip angle difference predicting section 16 to the understeering correction amount outputting section 33 or the oversteering correction amount outputting section 34.

The first direction determining section 32 has a sign comparing function, supplies the selecting section 31 with the determining signal H0 at, for example, H level based on a direction signal P of the angle difference signal $\beta fr$ supplied from the slip angle difference predicting section 16 and a direction signal N of the yaw rate Y supplied from the yaw rate sensor 9, when the direction signal P and the direction signal N coincide with each other (signs are same), and supplies the selecting section 31 with the determining signal H0 at, for example, L level when the direction signal P and the direction signal N differ from each other (signs are different).

When the direction signal P of the angle difference signal $\beta fr$ and the direction signal N of the yaw rate signal Y differ from each other (noncoincidence), for example, as the yaw rate Y is directed in the clockwise direction and the slip angle ($\beta f$) of the front wheel in the counterclockwise direction is larger than the slip angle ($\beta r$) of the rear wheel in the counterclockwise direction, the direction signal N of the yaw rate signal Y becomes plus (+) and the direction signal P of the angle difference signal $\beta fr$ becomes minus (−), the behavior of the vehicle is determined to be in the understeering region and the selecting section 31 selects the understeering correction amount outputting section 33.

When the direction signal P of the angle difference signal $\beta fr$ and the direction signal N of the yaw rate signal Y are the same (coincide with each other), in the case where, for example, the yaw rate Y is directed in the clockwise direction and the slip angle ($\beta r$) of the rear wheel in the counterclockwise direction is larger than the slip angle ($\beta f$) of the front wheel in the counterclockwise direction, the direction signal N of the yaw rate signal Y becomes plus (+) and the direction signal P of the angle difference signal $\beta fr$ becomes plus (+), behavior of the vehicle is determined to be in the oversteering region and the selecting section 31 selects the oversteering correction amount outputting section 34.

Strong understeering region of the behavior of the vehicle is a state in which even when the steering wheel is turned further from a current steering state, the vehicle is not curved further and is a steering region for making a driver feel a strong reaction force and informing the driver that the steering wheel had better be turned back.

Figure 11:
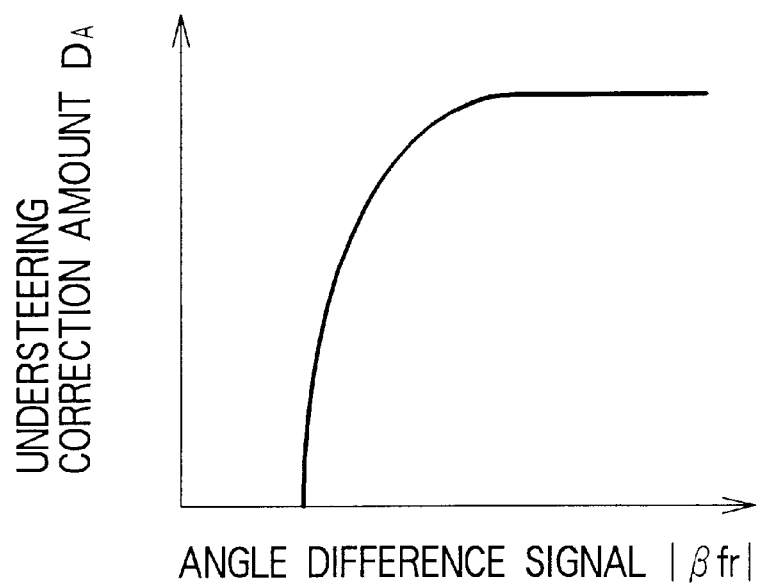
FIG. 11 is a graph illustrating characteristics of an angle difference signal βfr versus an understeering correction amount DA.

In a weak understeering region, correction of a road reaction force is not needed and accordingly, as shown in FIG. 11, a dead zone region of an understeering correction amount DA in respect of the angle difference signal $\beta fr$ is set to be large.

Meanwhile, a strong oversteering region of the vehicle is a state in which the vehicle may spin when the vehicle stays as it is and a driver is made feel a strong reaction force and countersteering is rendered easy to carry out.

The understeering correction amount outputting section 33 comprises a memory such as a ROM, pre-stores characteristic data of the absolute value |βfr| of the angle difference signal versus the understeering correction amount DA shown in FIG. 11. When the angle difference signal βfr is supplied from the selecting section 31, the understeering correction amount outputting section 33 reads a corresponding understeering correction amount DA and supplies the understeering correction amount signal DA to the multiplying section 35.

Figure 12:
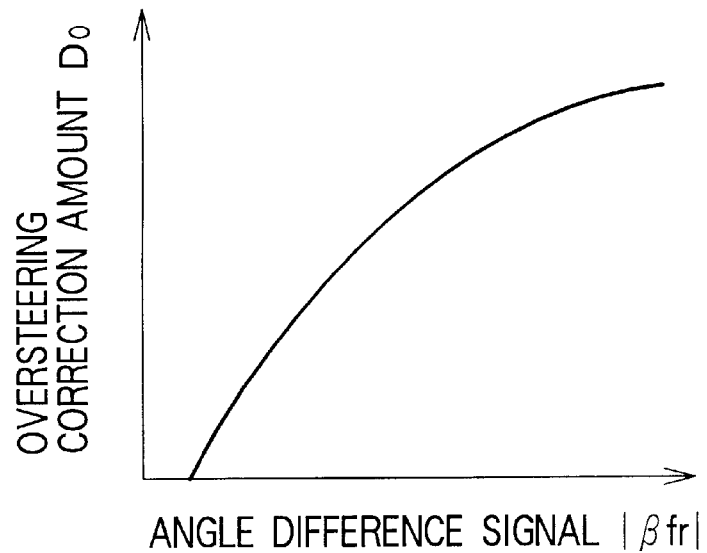
FIG. 12 is a graph illustrating characteristics of the angle difference signal βfr versus an oversteering correction amount DO.

The oversteering correction amount outputting section 34 comprises a memory such as a ROM and pre-stores characteristic data of the absolute value |βfr| of the angle difference signal versus an oversteering correction amount DO shown in FIG. 12. When the angle difference signal βfr is supplied from the selecting section 31, the oversteering correction amount outputting section 34 reads a corresponding oversteering correction amount DO and supplies the oversteering correction amount signal DO to the multiplying section 36.

As explained above, the correcting section 17 has the understeering correction amount outputting section 33 for outputting the understeering correction amount DA, the oversteering correction amount outputting section 34 for outputting the oversteering correction amount DO, the first direction determining section 32 for determining coincidence or noncoincidence of the direction P of the angle difference signal βfr detected by the slip angle difference predicting section 16 and the direction N of the yaw rate signal Y, and the selecting section 31 for selecting the understeering correction amount outputting section 33 when the determining signal HO from the first direction determining section 32 determines that the directions do not coincide with each other, and selecting the oversteering correction amount outputting section 34 when the determining signal HO determines that the directions coincide with each other. Accordingly, whether the behavior of the vehicle is in the understeering region or the oversteering region can be determined by the direction detected by the determining signal HO and the target torque signal IMS can be corrected in correspondence with the behavior of the vehicle.

For the understeering correction amount and the oversteering correction amount, respective dead zones are provided as shown in FIGS. 11 and 12, whereby optimum correction in accordance with the understeering state or the oversteering state can be carried out.

The multiplying section 35 has a sofrware-controlled multiplying function, multiplies the vehicle speed coefficient KR, the understeering correction amount signal DA and an angle difference change coefficient KV, and supplies an understeering correction amount signal IDA (=KR*KV*DA) as a subtracting correction signal to the subtracting section 37.

The understeering correction amount signal IDA is produced by correcting the understeering correction amount DA shown in FIG. 11 by the vehicle speed coefficient KR shown in FIG. 10. Thus, in a low vehicle speed region, the understeering correction amount DA is nullified and the correction is not carried out. For a region from a middle vehicle speed to a high vehicle speed, the understeering correction amount signal IDA may be set the same as in the characteristic of the understeering correction amount DA.

The multiplying section 36 has a software-controlled multiplying function, multiplies the vehicle speed coefficient KR, the oversteering correction amount signal DO and the angle difference change coefficient KV, and supplies the oversteering correction amount signal IDO (=KR*KV*DO) as a subtracting correction signal to the subtracting section 41.

The oversteering correction amount signal IDO is produced by correcting the overstesring correction amount DO shown in FIG. 12 by the vehicle speed coefficient KR shown in FIG. 10. Thus, in a low vehicle speed region, the oversteering correction amount DO is nullified and the correction is not carried out. In a region from a middle vehicle speed to a high vehicle speed, the oversteering correction amount signal IDO may be set to be the same as in the characteristic of the oversteering correction amount DO.

In comparison with the understeering correction amount DA, in the oversteering correction amount DO, the dead zone is set to be narrow and the inclination is set to be small.

The subtracting section 37 has a software-controlled subtracting function, constitutes a subtracting correction section operated in the understeering region, calculates the difference (=IMO−IDA) between the target torque signal IMO supplied from the multiplying section 24 and the understeering correction amount signal IDA (=KR*KV*DA) which is a subtracting correction signal supplied from the multiplying section 35, and supplies a new target torque signal IMA (=IMO−IDA) to the difference calculating section 22 as a target torque signal IMH via the subtracting section 41.

When the understeering correction amount signal IDA is outputted, the oversteering correction amount signal IDO is not outputted (IDO=0). Accordingly, the target torque signal IMH becomes equal to the target torque signal IMA (IMH=IMA).

The subtracting section 41 has a software-controlled subtracting function, constitutes a subtracting correction section operated in the oversteering region, calculates the difference (=IMO−IDO) between the target torque signal IMO supplied from the multiplying section 24 and the oversteering correction amount signal IDO (=KR*KV*DO) which is a subtracting correction signal supplied from the multiplying section 36, and supplies it to the difference calculating section 22 as the new target torque signal IMH.

As already explained, the correcting section 17 is provided with the subtracting correction section 37 for subtraction-correcting the target torque signal IMO with the subtracting correction signal IDA corresponding to the understeering correction amount DA from the understeering correction amount outputting section 33 and the subtracting correction section 41 for subtraction-correcting the target torque signal IMO with the subtracting correction signal IDO corresponding to the oversteering correction amount DO from the oversteering correction amount outputting section 34. Accordingly, a large reaction force can be transmitted to a driver via the steering wheel by reducing the assist torque by subtraction-correcting the target torque signal IMO with the subtracting correction signal IDA in the understeering region, and a large reaction force can be transmitted thereto by subtraction-correcting the target torque signal IMO with the subtracting correction signal IDO in the oversteering region.

Being provided with a differentiating function, the angle difference change amount calculating section 39 differentiates the angle difference signal βfr supplied from the slip angle difference predicting section 16 and supplies an angle difference change amount signal DV (=d βfr/dt) to the angle difference change coefficient generating section 40.

Figure 14:
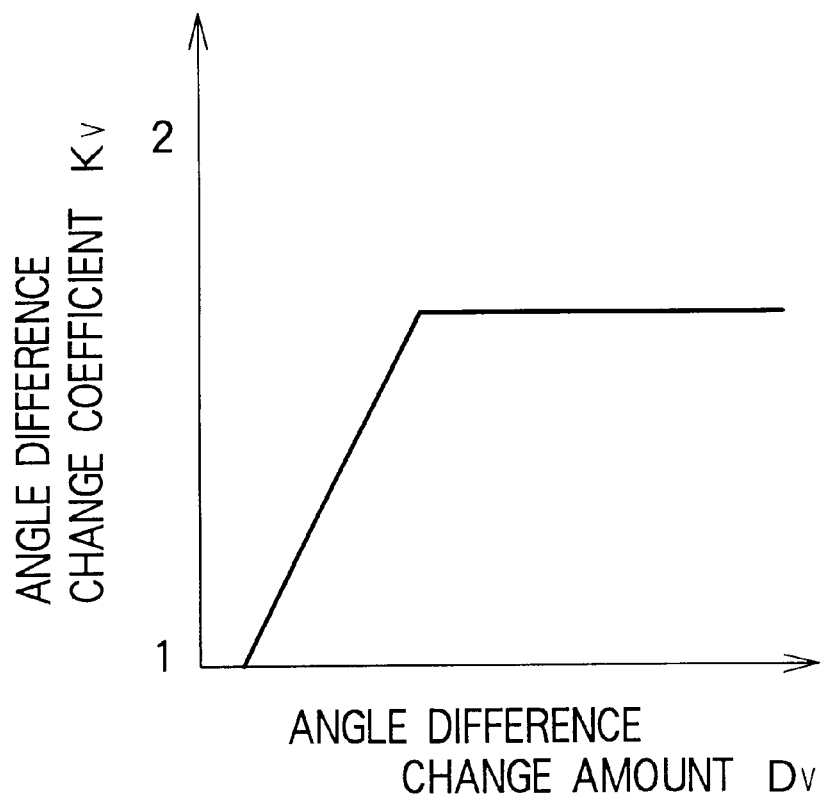
FIG. 14 is a graph illustrating characteristics of an angle difference change amount DV versus an angle difference change coefficient KV.

The angle difference change coefficient generating section 40 comprises a memory such as a RON which pre-stores characteristic data of the angle difference change amount DV versus the angle difference change coefficient KV shown in FIG. 14. When the angle difference change amount signal DV is supplied, the angle difference change coefficient generating section 40 reads a corresponding angle difference change coefficient KV and supplies it to the multiplying section 35 and the multiplying section 36.

The angle difference change amount DV represents a change in the angle difference signal βfr and hence a change in the timewise behavior of the vehicle and can thus generate the understeering correction amount signal IDA (=KR*KV*DA) or the oversteering correction amount signal IDO (=KR*KV*DO) in correspondence with a rapid change in the behavior of the vehicle.

Because the correcting section 17 has the angle difference change amount calculating section 39 for calculating the change amount DV of the angle difference signal βfr and the angle difference change coefficient generating section 40 for outputting the angle difference change coefficient KV in correspondence with the angle difference change signal DV from the angle difference change amount calculating section 39 and corrects the understeering correction amount DA and the oversteering correction amount DO by the angle difference change coefficient KV, even when the behavior of the vehicle is rapidly changed, a rapid change in the reaction force can be transmitted to the driver via the steering wheel.

Figure 4:
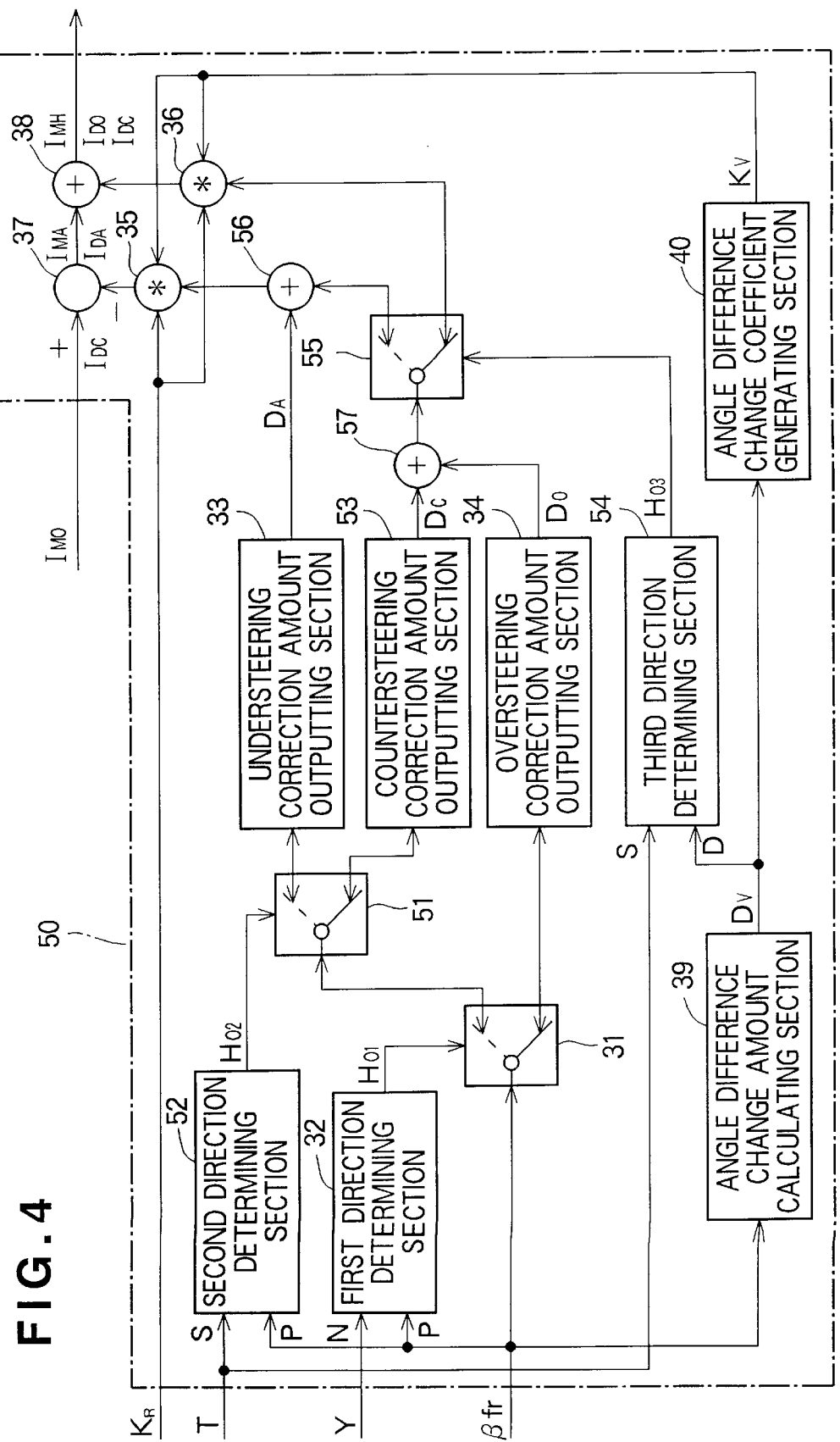
FIG. 4 is a block diagram showing a part of an altered form of the correcting section.

Referring to FIG. 4, discussion will be made next as to another embodiment of the correcting section. Note that the altered correcting section is designed to determine, in addition to the understeering state and the oversteering state, an excessive countersteering state and to carry out corrections in correspondence with respective behaviors of the vehicle.

As shown in FIG. 4, a correcting section 50 includes a selecting section 51, a second direction determining section 52, a countersteering correction amount outputting section 53, a third direction determining section 54, a selecting section 55, an adding section 56 and an adding section 57 in addition to the selecting section 31, the first direction determining section 32, the understeering correction amount outputting section 33, the oversteering correction amount outputting section 34, the multiplying section 35, the multiplying section 36, the subtracting section 37 and adding section 38 constituting an adding-subtracting correction section, the angle difference change amount calculating section 39 and the angle difference change coefficient generating section 40.

In relation to FIG. 3, discussion has already been made on the selecting section 31, the first direction determining section 32, the understeering correction amount outputting section 33, the oversteering correction amount outputting section 34, the multiplying section 35, the multiplying section 36, the subtracting section 37 constituting the subtracting correction section, the angle difference change amount calculating section 39, and the angle difference change coefficient generating section 40. Therefore, a further detailed explanation thereof will be omitted and only their partial elements will be included in the following explanation as they become necessary.

The selecting section 51 has a software-controlled switching function, switches a changeover switch based on a determining signal H02 supplied from the second direction determining section 52, and supplies the angle difference signal βfr fed from the selecting section 31 to the understeering correction amount outputting section 33 or the countersteering correction amount outputting section 53.

The second direction determining section 52 has a sign comparing function, supplies the determining signal H02 at, for example, H level to the selecting section 51 based on the direction signal P of the angle difference signal βfr fed from the slip angle difference predicting section 16 and a direction signal S of the steering torque signal T fed from the steering torque sensor 12 when the direction signal P and the direction signal S coincide with each other (signs are same), and supplies the determining signal H02 at, for example, L level to the selecting section 51 when the direction signal P and direction signal S differ from each other (signs are different).

When the direction signal P of the angle difference signal βfr and the direction signal S of the steering torque signal T differ from each other (noncoincidence), for example, where the steering torque signal T is directed in a clockwise direction and the slip angle (βf) of the front wheels in a counterclockwise direction is larger than the slip angle (βr) of the rear wheels in the counterclockwise direction, the direction signal S of the steering torque signal T becomes a plus (+) and the direction signal P of the angle difference signal βfr becomes a minus (−), the behavior of the vehicle is determined to be in the understeering region and the selecting section 51 selects the understeering correction amount outputting section 33 (designated by broken line).

Meanwhile, when the direction signal P of the angle difference signal βfr and the direction signal S of the steering torque signal T are the same (coincide), for example, where the steering torque signal T is directed in the clockwise direction while the slip angle (βr) of the rear wheels in the counterclockwise direction is larger than the slip angle (βf) of the front wheels in the counterclockwise direction, the direction signal S of the steering torque signal T becomes a plus (+) and the direction signal P of the angle difference signal βfr becomes a plus (+), the behavior of the vehicle is determined to be in the excessive countersteering region and the selecting section 51 selects the countersteering correction amount outputting section 53 (designated by bold line).

With regard to the first direction determining section 32 and the selecting section 31, note that where, for example, the yaw rate signal Y is in the clockwise direction and the front wheel slip angle (βf) in the counterclockwise direction is larger than the rear wheel slip angle (βr) in the counterclockwise direction, the direction signal N of the yaw rate signal Y becomes a plus (+) while the direction signal P of the angle difference signal βfr becomes a minus (−), whereupon the selecting section 31 selects the selecting section 51 (designated by broken line) while the selecting section 51 selects the understeering correction amount outputting section 33 or the countersteering correction amount outputting section 53 in accordance with a result of determination of the second direction determining section 52 mentioned above.

In regard to the first direction determining section 32 and the selecting section 31, note also that when the direction signal P of the angle difference signal βfr and the direction signal N of the yaw rate signal Y are the same (coincidence), for example, where the yaw angular rate signal Y is in the clockwise direction and the rear wheel slip angle (βr) in the counterclockwise direction is larger than the front wheel slip angle (βf) in the counter-clockwise direction, the direction signal N of the yaw rate signal Y becomes a plus (+) while the direction signal P of the angle difference signal βfr becomes a plus (+), whereupon the behavior of the vehicle is determined to be in the oversteering region and the selecting section 31 selects the oversteering correction amount outputting section 34 (designated by bold line).

Figure 13:
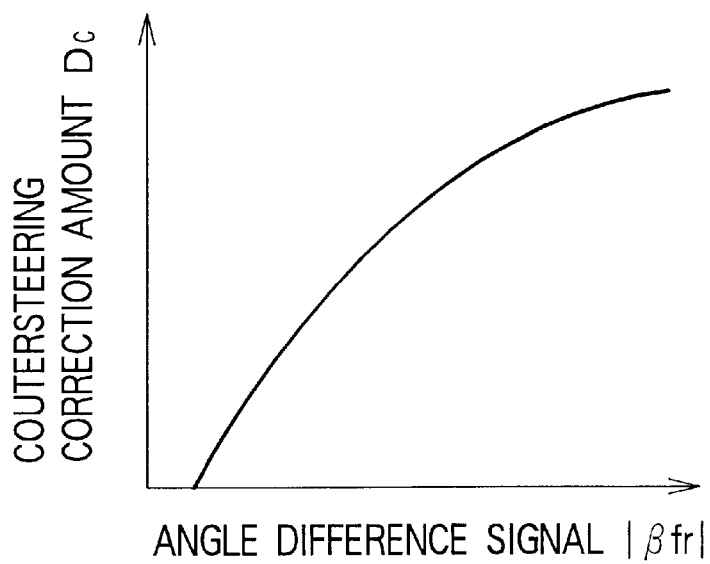
FIG. 13 is a graph illustrating characteristics of the angle difference signal βfr versus a countersteering correction amount DC.

The countersteering correction amount outputting section 53 has a memory such as a ROM and pre-stores characteristic data of the absolute value |βfr| of the angle difference signal versus a countersteering correction amount DC shown in FIG. 13. When the angle difference signal data βfr is supplied from the selecting section 51, the countersteering correction amount outputting section 53 reads out a corresponding countersteering correction amount DC and supplies a countersteering correction amount signal DC to the selecting section 55 via the adding section 57.

Being thus arranged, the correcting section 50 determines that the behavior of the vehicle is in the understeering state and selects the understeering correction amount outputting section 33 when the first direction determining section 32 determines that the direction signal P of the angle difference signal βfr and the direction signal N of the yaw rate signal Y do not coincide with each other and the second direction determining section 52 determines that the direction signal P of the angle difference signal βfr and the direction signal S of the steering torque signal T do not coincide with each other.

Further, the correcting section 50 determines that the behavior of the vehicle is in the excessive countersteering state and selects the countersteering correction amount outputting section 53 when the first direction determining section 32 determines that the direction signal P of the angle difference signal βfr and the direction signal N of the yaw rate signal Y do not coincide with each other and the second direction determining section 52 determines that the direction signal P of the angle difference signal βfr and the direction signal S of the steering torque signal T coincide with each other.

The third direction determining section 54 has a sign comparing function, supplies a determining signal H03 at, for example, H level to the selecting section 55 based on a direction signal D of the angle difference change amount signal DV (=d βfr/dt) fed from the angle difference change amount calculating section 39 and the direction signal S of the steering torque signal T when the direction signal D and the direction signal S coincide with each other (signs are same), and supplies the determining signal H03 at, for example, L level to the selecting section 55 when the direction signal D and the direction signal S differ from each other (signs are different).

The direction signal D of the angle difference change amount signal DV is determined to be negative (−) when the angle difference signal βfr is negative (−) and the absolute value |βfr| is increasing and is determined to be positive (+) when the absolute value |βfr| is decreasing.

The direction signal D of the angle difference change amount signal DV is determined to be positive (+) when the angle difference signal βfr is negative (−) and the absolute value |βfr| is increasing and is determined to be negative (−) when the absolute value |βfr| is decreasing.

When the direction signal D of the angle difference change amount signal DV (=d βfr/dt) and the direction signal S of the steering torque signal T do not coincide with each other (signs are different), the selecting section 55 selects the multiplying section 36 (designated by bold line) and supplies the countersteering correction amount DC or the oversteering correction amount DO to the multiplying section 36.

Meanwhile, when the direction signal D of the angle difference change amount signal DV (=d βfr/dt) and the direction signal S of the steering torque signal T coincide with each other (signs are same), the selecting section 55 selects the adding section 56 (designated by broken line) and supplies the countersteering correction amount DC or the oversteering correction amount DO to the adding section 56.

The countersteering correction amount DC supplied to the adding section 56 is multiplied at the multiplying section 35 by the vehicle speed coefficient KR and the angle difference change coefficient KV and a countersteering correction amount signal IDC (=KR*KV*DC) which is a subtracting correction signal is supplied to the subtracting section 37.

The countersteering correction amount DC or the oversteering correction amount DO fed to the multiplying section 36 is multiplied by the vehicle speed coefficient KR and the angle difference change coefficient KV and the countersteering correction amount signal IDC (=KR*KV*DC) or the oversteering correction amount signal IDO (=KR*KV*DO) is supplied to the adding section 38 which is adding section.

As described above, when the direction signal D of the angle difference change amount signal DV (=d βfr/dt) and the direction signal S of the steering torque signal T coincide with each other (signs are same) and the oversteering state is directed in a converging direction, further countersteering is not needed. Thus, the countersteering correction amount signal IDC (=KR*KV*DC) or the oversteering correction amount signal IDO (=KR*KV*DO) is subtracted from the target torque signal IMO and a target torque signal IMH (=IMO−IDC, IMO−IDO) is outputted, whereby a large reaction force is transmitted to the driver via the steering wheel.

When the direction signal D of the angle difference change amount signal DV (=d βfr/dt) and the direction signal S of the steering torque signal T do not coincide with each other (signs are different) and the oversteering state is directed in a diverging direction, the countersteering correction amount signal IDC (=KR*KV*DC) or the oversteering correction amount signal IDO (=KR*KV*DO) is added to the target torque signal IMO and a target torque signal IMH (=IMO+IDC, IMO+IDO) is outputted, whereby a small reaction force is transmitted to the driver via the steering wheel, urging countersteering.

Explanation as to the understeering state and the oversteering state will be omitted since contents thereof are the same as those explained in relation to FIG. 3.

Although the described embodiment is arranged such that the understeering correction amount signal DA and the countersteering correction amount signal IDC are added by using the adding section 56 and the vehicle speed coefficient KR and the angle difference change coefficient KV are multiplied by the multiplying section 36, the countersteering correction amount signal IDC (=KR*KV*DC) may be formed by providing a multiplying section for multiplying the countersteering correction amount signal IDC by the vehicle speed coefficient KR and the angle difference change coefficient KV, in place of the adding section 56. The target torque signal IMH (=IMO−IDC) may be outputted by providing a subtracting section for subtraction-correcting the target torque signal IMO with the countersteering correction amount signal IDC.

Being thus provided with the first direction determining section 32 for determining coincidence or noncoincidence of the direction signal P of the angle difference signal βfr and the direction signal N of the yaw rate signal Y, the second direction determining section 52 for determining coincidence or noncoincidence of the direction signal P of the angle difference signal βfr and the direction signal S of the steering torque signal T, and the selecting sections 31 and 51 for selecting the understeering correction amount outputting section 33 when both determination results of the first direction determining section 32 and the second direction determining section 52 indicate that the directions do not coincide with each other and for selecting the countersteering correction amount outputting section 53 when a result of determination of the first direction determining section 32 indicates that the directions do not coincide with each other and a result of determination of the second direction determining section 52 indicates that the directions coincide with each other, by determining the directions of the angle difference signal βfr, the yaw rate signal Y and the steering torque signal T, the correcting section 50 is capable of determining whether the behavior of the vehicle is in the understeering state or excessive countersteering state and of outputting the correction amount DA or DC in correspondence with the understeering state or excessive countersteering state.

Further, the correction section 50 is provided with the third direction determining section for determining coincidence or noncoincidence of the direction signal D of the differentiated value DV of the angle difference signal βfr and the direction signal S of the steering torque signal T and the addition-subtraction correction sections 37 and 38 for addition-correcting the target torque signal IMO with the adding correction signal (oversteering correction amount signal IDO or countersteering correction amount signal IDC) corresponding to the oversteering correction amount DO or the countersteering correction amount DC from the oversteering correction amount outputting section 34 or the countersteering correction amount outputting section 53 when a result of determination of the third direction determining section 54 indicates that the directions do not coincide with each other, and for subtraction-correcting the target torque signal IMO with the subtracting correction signal (oversteering correction amount signal IDO or the countersteering correction amount signal IDC) corresponding to the oversteering correction amount DO or the countersteering correction amount DC from the oversteering correction amount outputting section 34 or the countersteering correction amount outputting section 53 when the result of determination indicates that the directions coincide with each other. By determining the direction signal D of the differentiated value DV of the angle difference signal βfr and the direction signal S of the steering torque signal T, the correction section 50 can tell the driver through a reaction force that a counter-steering operation is excessively large or excessively small. This is achieved by adding the oversteering correction amount DO or the countersteering correction amount DC to the target torque signal IMO or subtracting the oversteering correction amount DO or the countersteering correction amount DC from the target torque signal IMO.

Further, since the correcting section 50 is provided with the angle difference change amount calculating section 39 for calculating the change amount DV of the angle difference signal βfr and the angle difference change coefficient generating section 40 for outputting the angle difference change coefficient KV corresponding to the angle difference change signal DV from the angle difference change amount calculating section 39 and corrects the understeering correction amount DA, the oversteering correction amount DO and the countersteering correction amount DC by the angle difference change coefficient KV, even when the behavior of the vehicle in the understeering state or the oversteering state is rapidly changed, the rapid change can be transmitted quicly to a driver as a change in the reaction force via the steering wheel.

Figure 5:
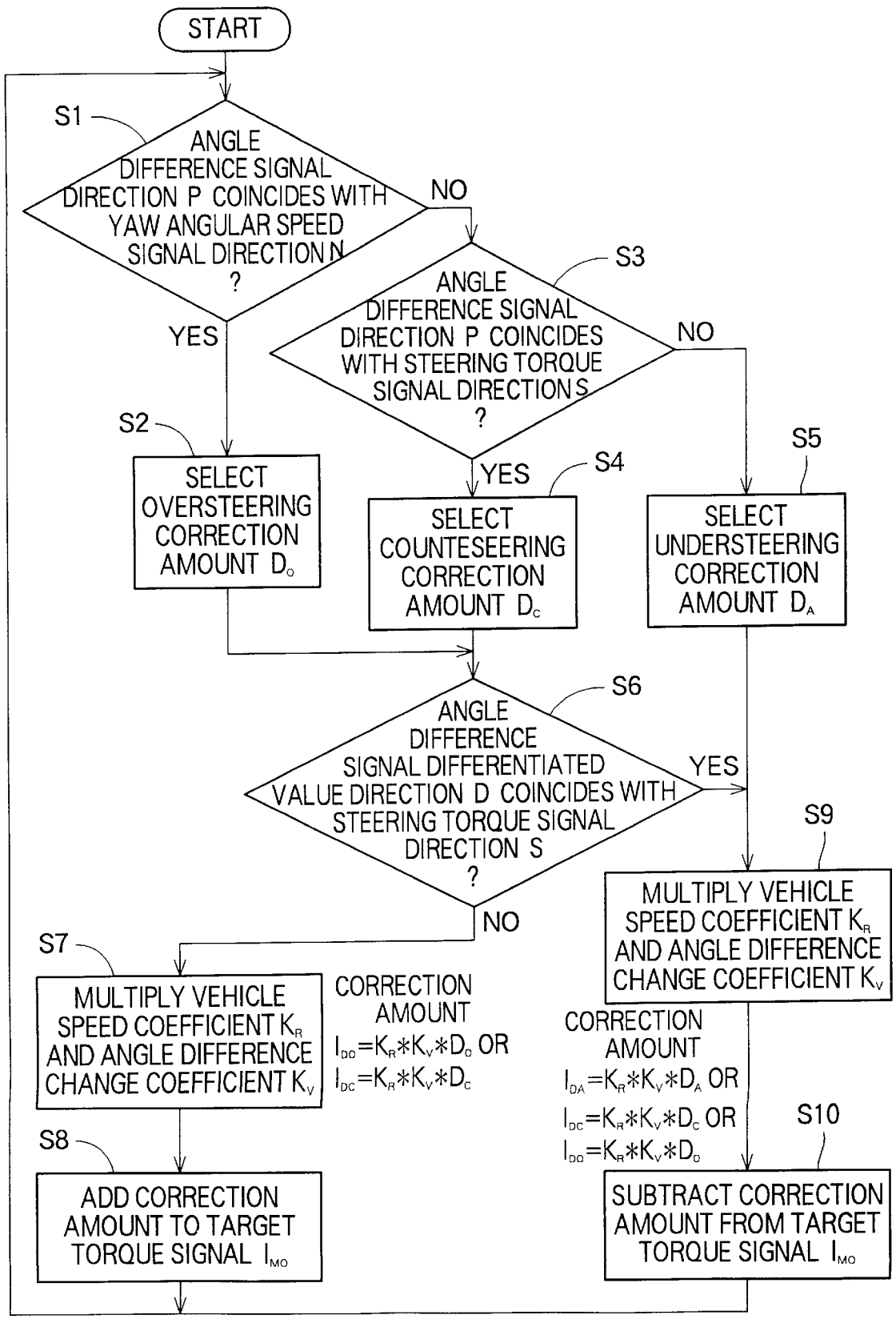
FIG. 5 is a flowchart showing operation of the correcting section of FIG. 4.

Referring to the flowchart of FIG. 5, operation of the correcting section shown in FIG. 4 will be discussed.

At step S1, the first direction determining section 32 determines coincidence or noncoincidence of the direction P of the angle difference signal and the direction N of the yaw rate signal. In the case of coincidence, the operation proceeds to step S2 where the selecting section 31 selects the oversteering correction amount DO. Thereafter, the operation proceeds to step S6. In the case of noncoincidence at step S1, the operation proceeds to step S3 where the second direction determining section 52 determines coincidence or noncoincidence of the direction P of the angle difference signal and the direction S of the steering torque.

When the directions coincide with each other at step S3, the operation proceeds to step S4 where the selecting section 51 selects the countersteering correction amount DC, whereafter the operation proceeds to step S6.

Meanwhile, when the directions do not coincide with each other at step S3, the operation proceeds to step S5 where the selecting section 51 selects the understeering correction amount DA, whereafter the operation proceeds to step S9.

At step S6, the third direction determining section 54 determines coincidence or noncoincidence of the direction D of the differentiated value of the angle difference signal and the direction S of the steering torque signal. In the case of noncoincidence, the operation proceeds to step S7 by selection by the selecting section 55. In the case of coincidence at step S6, the operation proceeds to step S9 by selection of the selecting section 55.

At step S7, the oversteering correction amount DO or the countersteering correction amount DC is multiplied by the vehicle coefficient KR and the angle difference change coefficient KV by which the correction amount IDO or the correction amount IDC is generated. Thereafter the operation proceed to step SS where the correction amount IDO or the correction amount IDC is added to the target torque signal IMO for correction of the latter.

At step S9, the understeering correction amount DA, the oversteering correction amount DO or the counter-steering correction amount DC is multiplied by the vehicle coefficient KR and the angle difference change coefficient KV by which the correction amount IDA, the correction amount IDO or the correction amount IDC is generated. Thereafter, the operation proceed to step S10 where the correction amount IDA, the correction amount IDO or the correction amount IDC is subtracted from the target torque signal IMO for correction of the latter.

Figure 6:
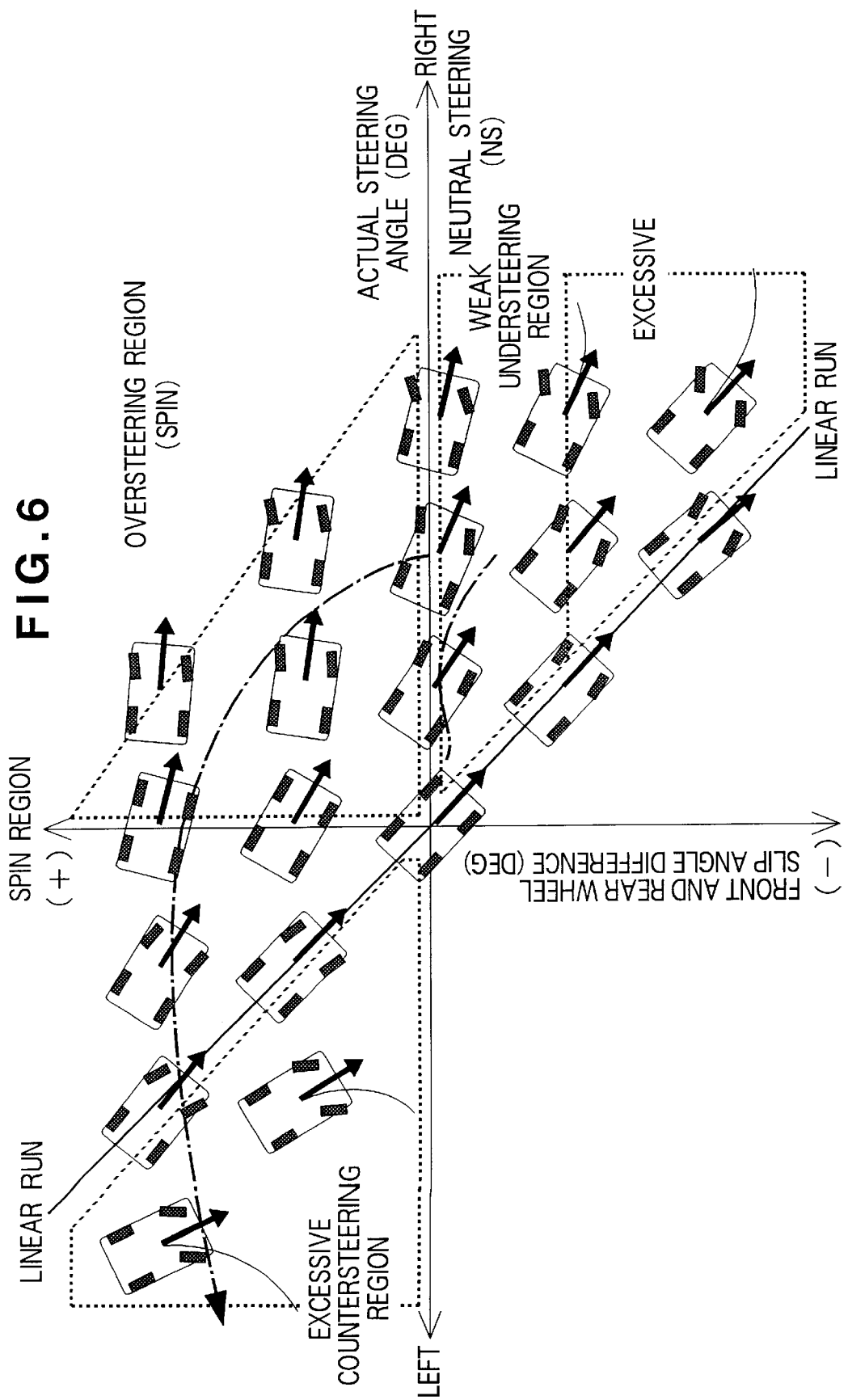
FIG. 6 is a Lissajous figure of an actual steering angle θ versus a front and rear wheel slip angle difference βfr of a vehicle carrying the electric power steering apparatus with the correcting section of FIG. 4.

Reference is now made to FIG. 6 which is a Lissajous diagram showing an actual steering angle θ versus a difference βfr between slip angles of front and rear wheels of the vehicle carrying the electric power steering apparatus having the correcting section of FIG. 4.

In FIG. 6, the coordinate of the actual steering angle θ is represented such that the steering angle θ is directed in the clockwise direction (+) in the right direction of the figure and the coordinate of the difference βfr between the slip angles of the front and rear wheels is minus (−) when the slip angle f of the front wheel is larger than the slip angle r of the rear wheel.

A running vehicle is brought into a linearly progressing state when both the actual steering angle θ and the difference βfr between the slip angles of the front and rear wheels are θ at an intersection of the coordinate of the actual steering angle θ and the coordinate of the difference βfr between the slip angles of the front and rear wheels.

In accordance with an increase in the actual steering angle θ in the clockwise direction (+ direction) from the state, the difference βfr between the slip angles of the front and rear wheels increases in the minus (−) direction and the vehicle keeps the linearly progressing state.

In the state (fourth quadrant of coordinate), the slip angle f of the front angle tends to increase more than, the slip angle βr of the rear wheel in respect of the increase in the actual steering angle θ and the understeering region where slippage of the front wheel is large is formed.

Further, a portion of the understeering region where the difference βfr between the slip angles of the front and rear wheels is disposed at a vicinity of 0, is referred to as a weak understeering region and a portion thereof in a range where the difference βfr between the slip angles of the front and rear wheels is large is referred to as an excessively large understeering region.

Further, a state where the difference βfr between the slip angles of the front and rear wheels is disposed at a vicinity of 0 even when the steering angle θ is increased from a state where both the actual steering angle θ and the differences βfr between the slip angles of the front and rear wheels are 0, is referred to as a neutral steering region.

When the difference βfr between the slip angles of the front and rear wheels is shifted to plus (+) from the neutral steering region (state where the slip angle βr of the rear wheels is larger than the slip angle βf of the front wheels and the rear wheels is slipping), the vehicle enters the overateering region (first quadrant of coordinate) and the vehicle spins when the oversteering state continues and the slip angle βr of the rear wheel is increased.

To prevent the vehicle from spinning, the steering wheel is operated in the counterclockwise direction, the actual steering angle is increased in the counterclockwise direction (− direction), slippage of the rear wheel is restrained and the slip angle βr of the rear wheel is controlled to reduce by which the vehicle can be recovered to the linearly progressing state at the second quadrant of coordinate.

The region (second quadrant of the coordinate) is referred to as countersteering region.

However, when the countersteering becomes excessive, the vehicle is deviated from a linearly progressing line and becomes remote from the radius.

When an amount of initial countersteering is made large, in order to make the vehicle ride on the linearly progressing line, a number of times of carrying operation in the clockwise direction and the counterclockwise direction of the steering wheel must be repeated and the behavior of the vehicle becomes irregular.

By applying the correcting section 50 discussed in relation to FIG. 4, the understeering state, oversteering state and excessive countersteering state of the vehicle are transmitted to the driver as a road reaction force via the steering wheel by which the driver can significantly improve control of the behavior of the vehicle (drifting run) explained in reference to FIG. 6.

Figure 7:
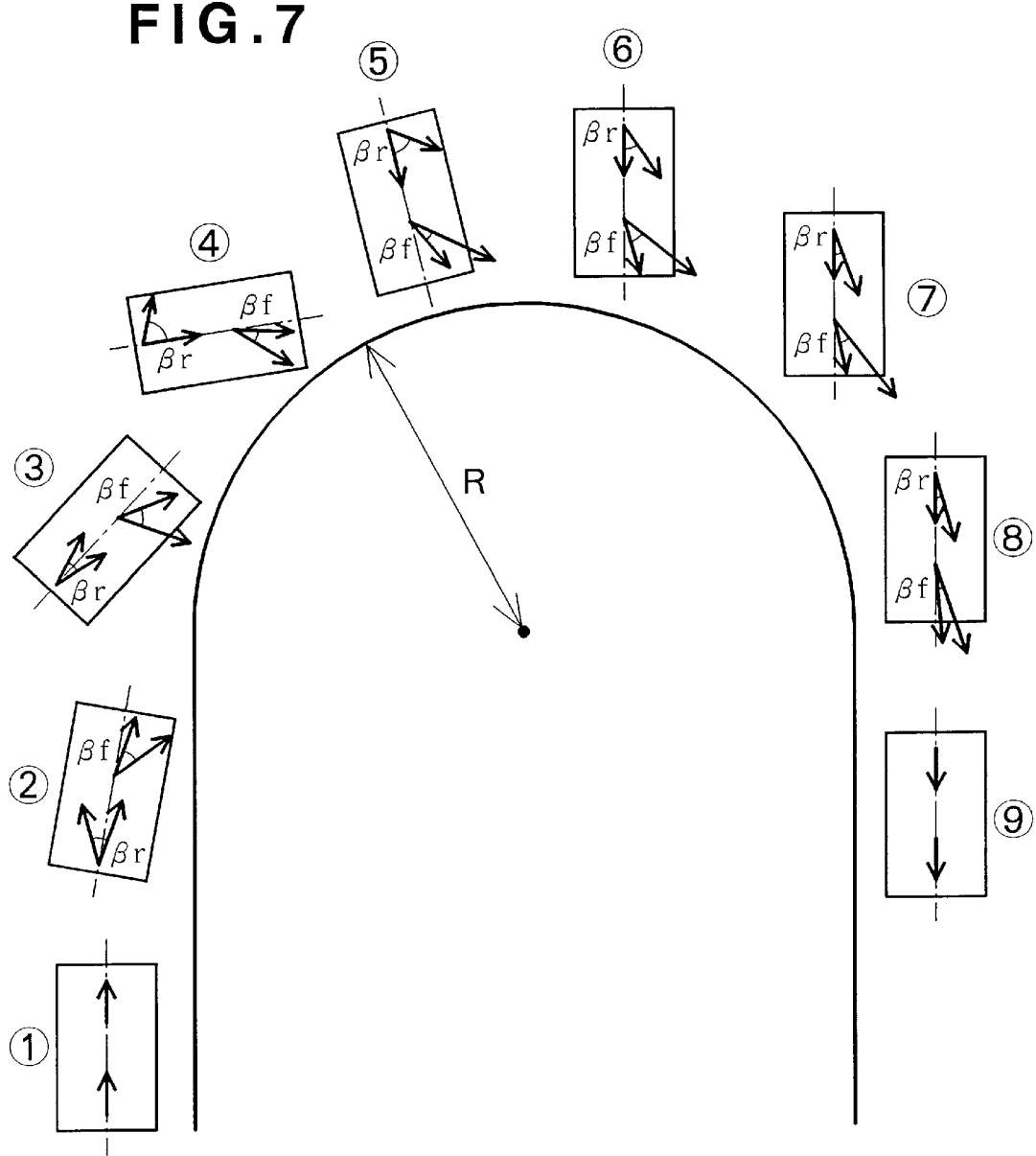
FIG. 7 is a schematic view illustrating drift running of a vehicle carrying the electric power steering apparatus according to the present invention.

FIG. 7 is a schematic view illustrating a drift run of the vehicle carrying the inventive electric power steering apparatus.

In relation to FIG. 7, explanation will be given of the operation wherein a progressing line of the vehicle is changed by a drift run at a curve having a radius of R.

When the steering wheel is operated in the right (clockwise) direction from a state ((①)) where the vehicle is progressing linearly, the slip angle βf of the front wheel becomes larger than the slip angle βr of the rear wheel, whereby the understeering state ((②) and (②)) is produced.

As the steering wheel is further operated in the right (clockwise) direction, the slip angle βr of the rear wheel becomes larger than the slip angle βf of the front wheel, whereby the vehicle enters the oversteering state ((④)).

When the slip angle βr of the rear wheel becomes far larger than the slip angle βf of the front wheel by continuing the oversteering state, the vehicle is spun. Thus, the assist torque is reduced and a large reaction force is transmitted to the driver.

The driver becomes conscious of a small assist torque and a large reaction force via the steering wheel and operates the steering wheel to the left (counterclockwise) direction. Then, the vehicle is brought into the countersteering state ((⑤)), the assist torque is reduced, and a large road reaction force is transmitted to the driver.

In this moment, when the driver carries out the steering operation in the counterclockwise direction more than necessary, the slip angle βf of the front wheel becomes larger than the slip angle βr of the rear wheel. Since the direction of the steering torque is in the counterclockwise direction, the excessive countersteering state where the assist torque is large and the road reaction force is small is produced. When the steering wheel operation is continued as it is, the vehicle is progressed from the corner toward an outer side.

When the driver operates steering wheel in the clockwise direction to avoid the situation, the slip angle βr of the rear wheel becomes larger than the slip angle βf of the front wheel and the wheel is brought from the excessive countersteering state again to the oversteering state.

In this way, when the excessive countersteering state is produced from the start, the recovery operation is difficult and the behavior of the vehicle (drifting run) becomes unstable.

Accordingly, the steering wheel is operated ((⑦) through (⑧)) such that the slip angle βf of the front wheels comes gradually nearer to the slip angle βr of the rear wheel and is made finally to become equal thereto in the countersteering operation by which the vehicle is brought into a linear progressing state ((⑨)) and the corner is cleared.

As thus far explained, according to the electric power steering apparatus of the present invention, the control unit is provided with the slip angle difference predicting section for predicting the difference between the slip angle of the front wheel and the slip angle of the rear wheel and the correcting section for correcting the target torque signal based on the angle difference signal from the slip angle difference predicting section in which the behavior of the vehicle is predicted from the angle difference signal, the target torque signal is corrected by the correction amount in correspondence with the angle difference signal, the motor for adding the assist torque to the steering system is controlled to drive in consideration of influence of a change in road reaction force and accordingly, a driver is given agile steering feeling in normally running the vehicle and in the understeering region or the oversteering region where the behavior of the vehicle is unstable, the driver can carry out optimum steering wheel operation in respect of the behavior of the vehicle by transmitting road reaction force to the driver.

Further, the slip angle difference predicting section according to the present invention calculates the angle difference based on the turn angle signal detected by the turn angle sensor for detecting the turn angle of the front wheel, the vehicle speed signal detected by the vehicle speed sensor, the yaw rate signal detected by the yaw rate sensor and the dimensional parameter of the vehicle and can calculate the angle difference by using the existing sensors mounted on the vehicle without actually detecting the angle difference and the differentiating circuit is not included in the calculation and accordingly, noise is not mixed and the accurate slip angle difference can be predicted.

Further, the correcting section according to the present invention determines whether the behavior of the vehicle is in the understeering region or the oversteering region depending on the direction detected by the determining signal and carries out correction in correspondence with the behavior of the vehicle and accordingly, the driver can accurately recognize the behavior of the vehicle in accordance with whether the vehicle is in the understeering state or the oversteering state.

Further, the correcting section according to the present invention can transmit large reaction force by reducing assist torque by correcting to subtract an amount from the target torque signal in the understeering region and can transmit small reaction force by correcting to subtract an amount from the target torque signal in the oversteering region and the characteristics can be set separately and accordingly, the driver can be conscious of the behavior of the vehicle and can carry out optimum steering wheel operation in correspondence with the behavior of the vehicle by intention of the driver.

Further, the correcting section according to the present invention can correct the understeering correction amount and the oversteering correction amount by the angle difference change coefficient and accordingly, can realize precise steering with fast response also in respect of rapid change in the behavior of the vehicle.

Further, the correcting section according to the present invention can determine whether the behavior of the vehicle is in the understeering state or the excessive countersteering state by determining the directions of the angle difference signal, the yaw rate signal and the steering torque signal and can output the correction amount in correspondence with the understeering state, oversteering state or the excessive large countersteering state and accordingly, a capacity of the driver can optimally be achieved even in the critical region of the behavior of the vehicle as in drifting run.

Further, the correcting section according to the present invention can transmit whether an amount of operating countersteering is excessively large or excessively small to a driver by reaction force by adding the oversteering correction amount or the countersteering correction amount to the target torque signal or subtracting it from the target torque signal by determining the direction of the differentiated value of the angle difference signal and the direction of the steering torque signal and accordingly, the capacity of the driver can be achieved to a limit even in the critical region of the behavior of the vehicle as in drifting run.

Further, the correcting section according to the present invention can correct the understeering correction amount, the oversteering correction amount and the countersteering correction amount by the angle difference change coefficient and accordingly, even when the behavior of the vehicle in the understeering, oversteering or countersteering state is rapidly changed, the rapid change can be transmitted to the driver swiftly as a change in the reaction force via the steering wheel and accordingly, the driver can swiftly deal therewith even in the critical region of the behavior of the vehicle as in drifting run or the like.

Accordingly, there is provided an electric power steering apparatus in which even when lateral acceleration G with friction coefficient as a parameter is in a nonlinear region or in the critical region of the vehicle behavior of understeering, oversteering and excessive countersteering state, the driver can accurately be conscious thereof and can carry out optimum steering desired by the driver without setting the reference lateral acceleration based on the friction coefficient of a road which is difficult to detect.

What is claimed is:

1. An electric power steering apparatus comprising:
   a steering torque sensor for detecting a steering torque of a steering system;
   an electric motor for applying an assist torque to said steering system; and
   a control unit having a target torque signal setting section for setting a target torque signal based on a steering torque signal from said steering torque sensor.
   wherein said control unit comprises a slip angle difference predicting section for predicting a difference between a slip angle of front wheels and a slip angle of rear wheels, and a correcting section for correcting the target torque signal based on an angle difference signal from said slip angle difference predicting section.

2. An electric power steering apparatus according to claim 1, further comprising a turn angle sensor for detecting a turn angle of said front wheels, a vehicle speed sensor for detecting a speed of a vehicle carrying said apparatus, and a yaw rate sensor for detecting a yaw rate produced in said vehicle, wherein said slip angle difference predicting section is designed to calculate the angle difference based on a turn angle signal from said turn angle sensor, a vehicle speed signal from said vehicle speed sensor, a yaw rate signal from said yaw rate sensor, and dimensional parameters of said vehicle.

3. An electric power steering apparatus according to claim 1, wherein said correcting section further comprises;
   an understeering correction amount outputting section for outputting an understeering correction amount;
   an oversteering correction amount outputting section for outputting an oversteering correction amount;
   a first direction determining section for determining coincidence or noncoincidence between a direction of the angle difference signal detected by said slip angle difference predicting section and a direction of the yaw rate signal from said yaw rate sensor; and
   a selecting section for selecting said oversteering correction amount outputting section when a determining signal from said first direction determining section indicates coincidence of the directions and selecting said understeering correction amount outputting section when the determining signal indicates noncoincidence of the directions.

4. An electric power steering apparatus according to claim 3, wherein said correction section further comprises:
   a subtracting correction section for subtraction-correcting the target torque signal with a subtracting correction signal corresponding to the understeering correction amount from said understeering correction amount outputting section; and
   a subtracting correction section for subtraction-correcting the target torque signal with a subtracting correction signal corresponding to the oversteering correction amount from said oversteering correction amount outputting section.

5. An electric power steering apparatus according to claim 3, wherein said correcting section further comprises;
   an angle difference change amount calculating section for calculating an amount of change of the angle difference signal; and
   an angle difference change coefficient generating section for outputting an angle difference change coefficient corresponding to an angle difference change signal from said angle difference change amount calculating section, the angle difference change coefficient being used to correct the understeering correction amount and the oversteering correction amount.

6. An electric power steering apparatus according to claim 1, wherein said correcting section further comprises:
   an understeering correction amount outputting section for outputting an understeering correction amount; an oversteering correction amount outputting section for outputting an oversteering correction amount;

a countersteering correction amount outputting section for outputting a countersteering correction amount;

a first direction determining section for determining coincidence or noncoincidence between a direction of the angle difference signal from said slip angle difference predicting section and a direction of a yaw rate signal from a yaw rate sensor provided in said apparatus for detecting a yaw rate produced in said vehicle;

a second direction determining section for determining coincidence or noncoincidence between the direction of the angle difference signal from said slip angle difference predicting section and a direction of the steering toque signal from said steering torque sensor; and a selecting section for selecting said oversteering correction amount outputting section when results of determination by said first direction determining section indicate coincidence of the directions, selecting said understeering correction amount outputting section when both results of determination by said first direction determining section and the second direction determining section indicate noncoincidence of the directions and selecting said countersteering correction amount outputting section when a result of determination by said first direction determining section indicates noncoincidence of the directions and a result of determination of said second direction determining section indicates coincidence of the directions.

7. An electric power steering apparatus according to claim 6, wherein said correcting section further comprises:

a subtracting correction section for subtraction-correcting the target torque signal with a subtracting correction signal corresponding to the understeering correction amount from said understeering correction amount outputting section;

a third direction determining section for determining coincidence or noncoincidence between a direction of a differentiated value of the angle difference signal and a direction of the steering torque signal; and an adding-subtracting correction section for addition-correcting the target torque signal with an adding correction signal corresponding to the oversteering correction amount from said oversteering correction amount outputting section or to the countersteering correction amount from said countersteering correction amount outputting section when a result of determination of said third direction determining section indicates non-coincidence of the directions and for subtraction-correcting the target torque signal with a subtracting correction signal corresponing to the oversteering correction amount from said oversteering correction amount outputting section or to the countersteering correction amount from said countersteering correction amount outputting section when the determination result from said third direction determining section indicates coincidence of the directions.

8. An electric power steering apparatus according to claim 6, wherein said correcting section further comprises:

an angle difference change amount calculating section for calculating an amount of change of the angle difference signal; and is an angle difference change coefficient generating section for outputting an angle difference change coefficient corresponding to an angle difference change signal from said angle difference change amount calculating section, the angle difference change coefficient being used to correct the understeering correction amount, the oversteering correction amount and the countersteering correction amount.

9. An electric power steering apparatus according to claim 4, wherein said correcting section further comprises:

an angle difference change amount calculating section for calculating an amount of change of the angle difference signal; and an angle difference change coefficient generating section for outputting an angle difference change coefficient corresponding to an angle difference change signal from said angle difference change amount calculating section, the angle difference change coefficient being used to correct the understeering correction amount and the oversteering correction amount.

10. An electric power steering apparatus according to claim 7, wherein said correcting section further comprises:

an angle difference change amount calculating section for calculating an amount of change of the angle difference signal; and an angle difference change coefficient generating section for outputting an angle difference change coefficient corresponding to an angle difference change signal from said angle difference change amount calculating section, the angle difference change coefficient being used to correct the understeering correction amount, the oversteering correction amount and the countersteering correction amount.

* * * * *